(12) United States Patent  
Freiser

(10) Patent No.: US 9,359,032 B2  
(45) Date of Patent: Jun. 7, 2016

(54) VEHICLE LIGHT APPARATUS

(71) Applicant: Erik Dillon Freiser, North Hollywood, CA (US)

(72) Inventor: Erik Dillon Freiser, North Hollywood, CA (US)

(73) Assignee: Erik Dillon Freiser, North Hollywood, CA (US)

( * ) Notice: Subject to any disclaimer, the term of this patent is extended or adjusted under 35 U.S.C. 154(b) by 0 days.

(21) Appl. No.: 14/611,001

(22) Filed: Jan. 30, 2015

(65) Prior Publication Data

US 2015/0146449 A1     May 28, 2015

Related U.S. Application Data

(63) Continuation-in-part of application No. 13/969,111, filed on Aug. 16, 2013, now Pat. No. 9,067,535.

(60) Provisional application No. 61/708,467, filed on Oct. 1, 2012, provisional application No. 61/708,387, filed on Oct. 1, 2012.

(51) Int. Cl.
| | |
|---|---|
| *B62J 6/00* | (2006.01) |
| *B62J 6/04* | (2006.01) |
| *F21V 21/08* | (2006.01) |
| *F21V 23/02* | (2006.01) |
| *F21V 21/26* | (2006.01) |
| *F21S 8/10* | (2006.01) |

(52) U.S. Cl.
CPC ............. *B62J 6/04* (2013.01); *F21S 48/212* (2013.01); *F21V 21/08* (2013.01); *F21V 21/26* (2013.01); *F21V 23/023* (2013.01); *Y10T 29/4913* (2015.01); *Y10T 29/49169* (2015.01)

(58) Field of Classification Search
CPC .............. B62J 6/00; B62J 6/001; B62J 6/005; B62J 6/16; B62J 6/04; B60Q 1/26; Y10S 362/80; F21Y 2101/02; G08B 5/24; B62K 19/16; Y10T 29/4913; Y10T 29/49169; F21V 21/08; F21V 21/26; F21V 23/023; F21S 48/212

See application file for complete search history.

(56) References Cited

U.S. PATENT DOCUMENTS

| 4,051,361 | A | 9/1977 | Lichon et al. |
| 4,598,339 | A | 7/1986 | Ainsworth |
| 5,379,197 | A | 1/1995 | Conyers et al. |
| 6,731,202 | B1 * | 5/2004 | Klaus .......................... 340/425.5 |

(Continued)

FOREIGN PATENT DOCUMENTS

| CN | 1759031 A | 4/2006 |
| RU | 41835 U1 | 11/2004 |

OTHER PUBLICATIONS

U.S. Appl. No. 14/278,270, of Freiser, E.D. filed May 15, 2014.  
Non-Final Office Action mailed Oct. 23, 2014 in Co-Pending U.S. Appl. No. 13/969,111 of Freiser, E.D., filed Aug. 16, 2013.

(Continued)

*Primary Examiner* — Tracie Y Green  
(74) *Attorney, Agent, or Firm* — Perkins Coie LLP

(57) ABSTRACT

A vehicle light apparatus is described herein that can be used to increase the visibility profile of a vehicle. The apparatus includes a base adapted to connect to a vehicle frame; a power supply; and an elongated light source supported by the base and coupled to the power supply. The elongated light source can extend above the vehicle frame with respect to a surface the vehicle is to traverse thereon. The elongated light source can also be configured to move upon experiencing pressure (e.g., from a rider's leg) and, upon removal of said pressure, return to its original position.

23 Claims, 23 Drawing Sheets

(56) References Cited

U.S. PATENT DOCUMENTS

| | | | |
|---|---|---|---|
| 7,367,700 B2* | 5/2008 | Chasmar | 362/473 |
| 8,434,921 B2* | 5/2013 | Sherwin | 362/473 |
| 8,643,722 B2* | 2/2014 | Solida | 348/148 |
| 2004/0213006 A1 | 10/2004 | Elliott | |
| 2012/0200401 A1* | 8/2012 | Goldwater | 340/432 |
| 2013/0148375 A1* | 6/2013 | Connor | 362/554 |

OTHER PUBLICATIONS

Notice of Allowance mailed Mar. 12, 2015, in U.S. Appl. No. 13/969,111 of Freiser, E.D., filed Aug. 16, 2013.
International Search Report mailed Nov. 28, 2013, for International Patent Application No. PCT/US2013/056503.
Written Opinion mailed Oct. 23, 2013, for International Patent Application No. PCT/US2013/056503.

* cited by examiner

Top View 1  Top View 2

1302
1304
Side View 1302
1304
Rear View

VEHICLE LIGHT APPARATUS

CROSS-REFERENCE TO RELATED APPLICATION

This application is a continuation-in-part of U.S. patent application Ser. No. 13/969,111, filed Aug. 16, 2013, which claims the benefits of U.S. Provisional Patent Application Ser. No. 61/708,467, filed on Oct. 1, 2012, and U.S. Provisional Patent Application Ser. No. 61/708,387 filed on Oct. 1, 2012. The subject matters thereof are all incorporated herein by reference in their entirety.

RELATED FIELD

Some embodiments relate generally to a vehicle light apparatus and, in particular, to a lighting apparatus that can be used to increase or expand the visibility profile of a vehicle and/or its rider.

BACKGROUND

Wheelchairs, motorcycles, mopeds, and bicycles have profiles that are lower to the ground relative to cars and trucks, with which these vehicles share a road. Accordingly, these vehicles are known as "low profile vehicles." The result of a low profile is an inability to be recognized by other drivers. Low visibility and an inability to be seen makes low profile vehicles inherently less safe than the taller vehicles that low profile vehicles negotiate with every day in traffic. Because other drivers are unable to see or to at least quickly recognize low profile vehicles while driving, the low profile vehicles are subject to a safety disadvantage that frequently results in accidents. Drivers of cars and trucks are often unable to see low profile vehicles until it is too late to avoid a collision. Accidents between low profile vehicles and higher profile cars and trucks can be especially dangerous due to the size differential of the vehicles.

Vehicle safety lights are currently available for vehicles, such as motorcycles and bicycles. However, safety lights for low profile vehicles have a small silhouette and are generally attached directly to the existing vehicle frame. For example, small light emitting diode (LED) bicycle safety lights are designed to be attached to the frame under the seat. Because bicycles share the road with vehicles that have much larger profiles (e.g., riders seated much higher), a safety light positioned in this location serves a limited purpose. Visibility of low profile vehicles is limited because traditional safety lights are configured to stay within the profile of the vehicle. Therefore, low profile vehicles are still subject to frequent dangerous accidents despite the availability of safety lights.

Whip lights and light poles are sometimes used on recumbent bicycles and all-terrain vehicles ("ATVs"). Because of the whip lights' and the light poles' rigid nature, these devices cannot be used on vehicles that require a rider to mount the frame (i.e., bicycle, motorcycle).

DISCLOSURE OVERVIEW

Introduced herein are various embodiments for a vehicle light apparatus that can be used to increase or expand the visibility profile of a vehicle, especially mountable vehicles, by a lighting apparatus that rises above a low profile vehicle's frame. Various embodiments described herein include a base adapted to connect to a vehicle frame; a power supply; and an elongated light source supported by the base and coupled, directly or indirectly, to the power supply. The elongated light source is adapted to extend above the vehicle frame with respect to a surface the vehicle frame is to traverse thereon. By extending above the vehicle, the vehicle light apparatus increases the distance from which the vehicle can be seen.

The vehicle light apparatus may be adapted for use with a vehicle frame that is adapted for riding. For example, the vehicle frame may belong to a bicycle, wheelchair, recumbent bicycle, motorcycle, moped, scooter, ATV, or a trike. The elongated light source can be configured to extend above the vehicle frame in a vertical orientation and move upon experiencing pressure, wherein upon removal of said pressure the elongated light source returns to the vertical orientation. In some embodiments, the elongated light source is adapted to pivot from the base, such that the entirety or a portion of the elongated light source is displaced when sufficient force is applied. In some embodiments, the elongated light source is constructed of a segmented rigid material linked by flexible material configured to warp under pressure (e.g., when a human thigh moves over the elongated light source) and unwarp upon removal of said pressure without breaking.

The vehicle light apparatus can be configured to be detachably connectable from the vehicle frame, a rider, etc. In some embodiments, the base is configured to be detachable from the vehicle frame. In some embodiments, the elongated light source is configured to be detachable from the base.

In some embodiments, the elongated light source is configured to provide illumination in 180 degrees or greater. However, the elongated light source can be configured to provide illumination in any field up to 360 degrees. The elongated light source may be adapted to provide a substantially uniform illumination, an irregular illumination pattern, or any combination thereof In some embodiments, the illumination field of the elongated light source can be toggled by a rider, a light sensor, a motion sensor, etc. The elongated light source may also comprise an extra row or column of lights that intensify when the rider utilizes the brakes or begins to turn. The vehicle light apparatus may be configured such that all of the lights can be intensified together, in programmed patterns, or in random patterns.

According to various embodiments, the elongated light source utilizes a telescoping mechanism to extend above the vehicle frame when fully protracted. One skilled in the art would appreciate that the elongated light source may be configured to retract into different positions, including into the base. In some embodiments, the base utilizes a telescoping mechanism to extend away from the vehicle frame when fully protracted.

According to some embodiments, the vehicle light apparatus includes a motion sensor (e.g., accelerometer, Global Positioning System (GPS) device, inertia sensor). The motion sensor can be used to trigger changes in illumination intensity or pattern, track movement or timing, as part of an anti-tampering system, etc.

The Disclosure Overview is provided to introduce a selection of embodiments in a simplified form that are further described below in the Detailed Description. Some embodiments have other aspects, elements, features, and steps in addition to or in place of what is described above. These potential additions and replacements are described throughout the rest of the specification. Other advantages and features will become apparent when viewed in light of the Detailed Description taken in conjunction with the attached drawings and claims.

BRIEF DESCRIPTION OF THE DRAWINGS

These and other objects, features, and characteristics will become more apparent to those skilled in the art from a study of the following Detailed Description in conjunction with the appended claims and drawings, all of which form a part of this specification.

The figures depict various embodiments described throughout the Detailed Description for purposes of illustration only. One skilled in the art will readily recognize from the following Detailed Description that various embodiments of the structures and methods illustrated herein may be employed without departing from the principles of the invention described herein.

DETAILED DESCRIPTION

Glossary

Detachably Connectable—Capable of being readily and repeatedly attached and detached without the use of any tools other than a rider's own hands. Can use, for example, a quick-release mechanism, such as a button, knob, magnet, etc.

Elongated—Unusually long in relation to its width. May be synonymous with extended, lengthened, or slender in some cases.

Fixedly Attached—Incapable of being attached and detached quickly without the use of tools. May be synonymous with permanently or semi-permanently attached. Can use, for example, a securing plate with nuts, screws, etc.

Illumination Field—The total area illuminated by a light source.

Irregular Illumination Field—An illumination field that experiences changing light intensity over a given timeframe. The changes may be due, for example, to a nonuniform light pattern (e.g., pulsing).

Passive Light Source—A light source that provides illumination by reflecting light emitted by another (i.e., distinct) light source.

Substantially Uniform—Nearly, or very nearly, constant.

Vehicle—Any means in or by which someone travels or in or by which something is conveyed or transported. A vehicle may be, for example, a bicycle, a wheelchair, a recumbent bicycle, a motorcycle, a moped, a scooter, an ATV, or a trike.

Disclosure

Various embodiments will now be described. The following description provides specific details for a thorough understanding and enabling description of these examples. One skilled in the art will understand, however, that embodiments may be practiced without many of these details. Additionally, some well-known structures or functions may not be shown or described in detail, so as to avoid unnecessarily obscuring the relevant description. Although the diagrams may depict components as functionally separate, such depiction is merely for illustrative purposes. It will be apparent to those skilled in the art that the components portrayed in these figures may be combined or divided into separate components.

Figure 1:
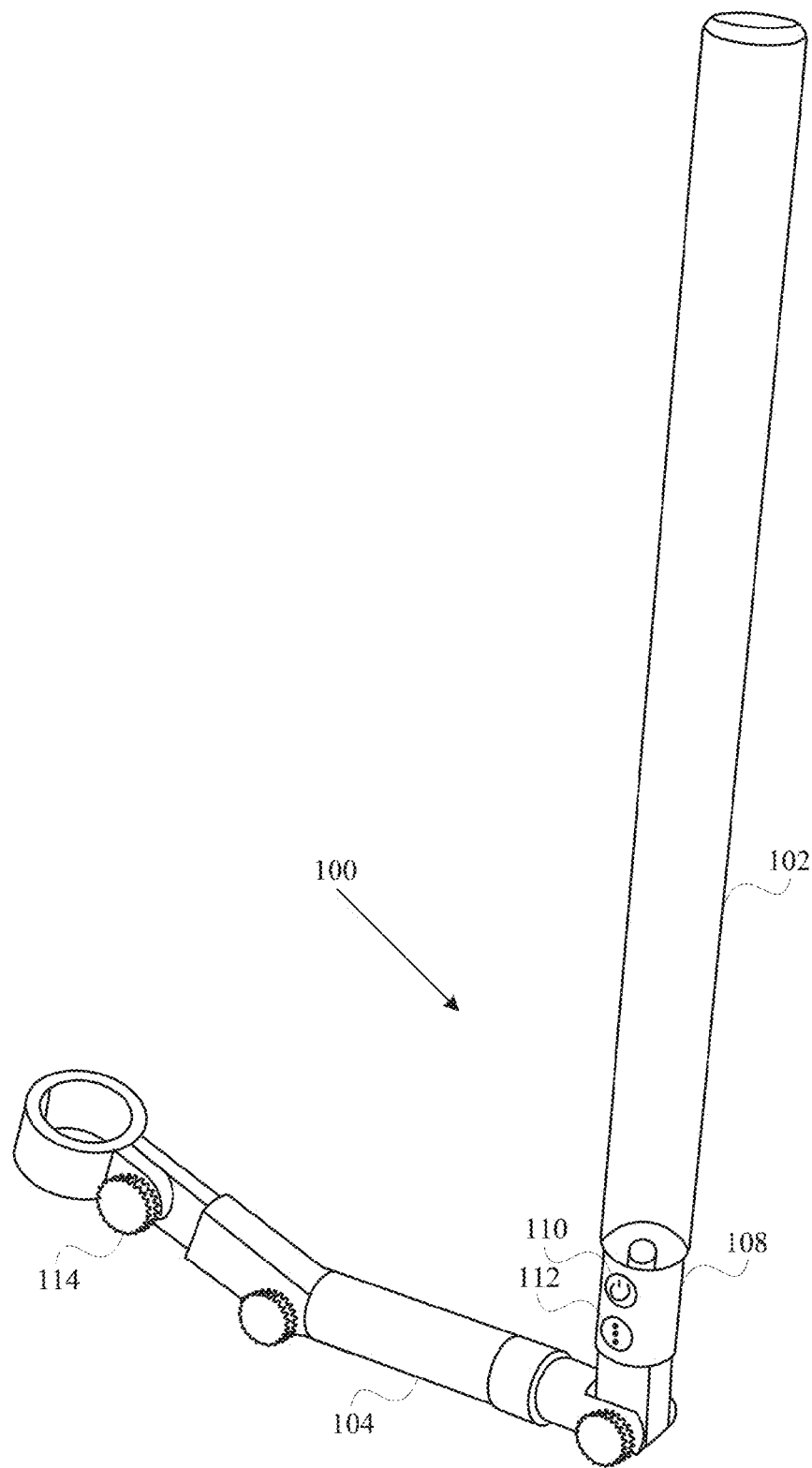
FIG. 1 is a perspective view of a vehicle light apparatus according to one embodiment of the disclosure.

FIG. 1 is a perspective view of a vehicle light apparatus 100 according to one embodiment. The vehicle light apparatus 100 includes an elongated light source 102 supported by a base 104 that is coupled, directly or indirectly, to a power supply 108. In some embodiments, the base 104 includes one or more buttons 110, 112 that can be used to turn the power on/off, cycle through various lighting modes, etc. The base 104 can be adapted to couple to a vehicle frame of a vehicle. The vehicle may be, for example, a bicycle, wheelchair, recumbent bicycle, motorcycle, moped, scooter, ATV, or trike. However, the vehicle light apparatus 100 can be adapted for any other suitable vehicle frame. In general, the vehicle frame is adapted for riding. In some embodiments, the base 104 is detachably connectable to and from the vehicle frame. For example, the base may include a quick-release button, turn-knob 114, magnet, etc., that allows the base 104 to be attached to and removed from the vehicle frame. Similarly, the elongated light source 102 can be detachably connectable to and from the base 104. For example, the elongated light source 102 and/or base 104 may include a quick-release mechanism (e.g., buttons 110, 112, turn-knob 116, threaded end connection (i.e., twist on/off), magnet) that allows the elongated light source 102 to be attached to and removed from the base 104.

In various embodiments, the base 104 is adapted such that the vehicle light apparatus 100 is positioned at or substantially near the rear of the vehicle. The base 104 may also be adapted such that the vehicle light apparatus 100 is positioned to one side of, in front of, or above the vehicle. For example, the vehicle light apparatus 100 can be configured to attach to a saddle rail of a bicycle and extend horizontally to one side of the bicycle. In some embodiments, the base 104 or elongated light source 102 is detachably connectable to and from the vehicle frame or base 104 respectively. A detachably connectable base 104 and/or elongated light source 102 allows a rider to store and readily reconfigure the vehicle light apparatus 100 in a modular fashion. The base 104 can be made of metal, carbon fiber, (poly)resin, any other rugged, weather-resistant material, or any combination thereof. In some embodiments, the base 104 and/or housing for the elongated light source 102 are made of carbon fiber or a similar lightweight material.

Figure 2:
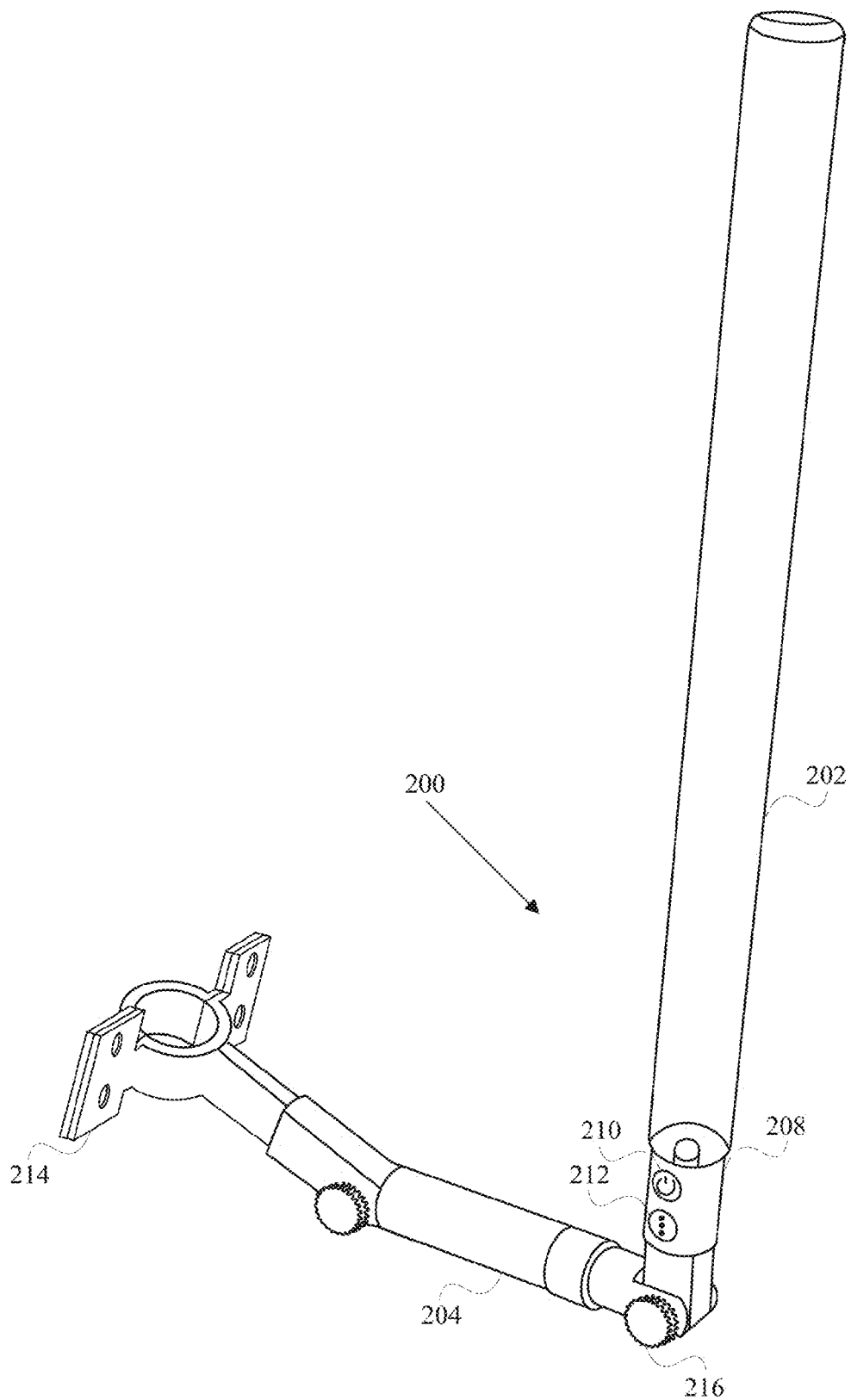
FIG. 2 is a perspective view of a vehicle light apparatus according to one embodiment of the disclosure.

In FIG. 1, the base 104 is illustrated as including a series of tightening knobs 114, 116, 118 that can be used to secure the elongated light source 102 to the base 104, attach the vehicle light apparatus 100 to a vehicle frame, and orient the vehicle light apparatus 100 in a particular alignment. However, other mechanisms for securing the vehicle light apparatus 100 to the vehicle frame are also contemplated by this disclosure. For example, FIG. 1 illustrates a clamp that can be tightened and loosened by turn-knob 114. As another example, FIG. 2 illustrates a securing plate that can be installed using nuts, bolts, etc.

In various embodiments, the elongated light source 102 is supported by the base 104 and contains one or more light emitting diodes (LEDs), an alternative light source (e.g., fluorescent emitter, incandescent emitter, phosphorescent emitter), or some combination thereof. One skilled in the art would recognize that a number of light sources and configurations (e.g., columnar, circular, zigzag) are available that could perform properly under the described conditions. The light sources can be housed in a translucent (e.g., semi-transparent) or transparent polymeric or plastic column. The housing may include patterns or have different degrees of transparency. For example, the housing may be a gray smoked polycarbonate housing that matches the vehicle frame when not illuminated. One skilled in the art would appreciate that many materials allow light to pass through and may be considered appropriate substitutes (e.g., glass, thermoplastic). For example, the elongated light source 102 may comprise high-powered LEDs housed within a red translucent plastic column. As another example, red high-powered LEDs could be housed within a transparent plastic column.

The column of the elongated light source 102 may take various forms, including, but not limited to, a circular column, semi-circular column, rectilinear column, octahedral column, or curved half-parabola column. The light sources (e.g., LEDs, fluorescent emitter, phosphorescent emitter), also called light emitters, may be arranged down the entirety of the column or any portion thereof. In various embodiments, the diameter of the elongated light source 102 varies from less than an inch to several inches. The LEDs may be arranged in columns, rows, a zigzag pattern, various curvilinear, rectilinear or random patterns, or any combination thereof within the housing. In some embodiments, light emitters can be arranged in sections (e.g., top/middle/bottom, left/right) that illuminate in different patterns or with different intensities. Although the elongated light source 102 may vary in height from six inches to five feet, the height is preferably substantially near the length of an average human thigh. The vehicle light apparatus 100 is designed such that the elongated light source 102 rises above the vehicle frame to enhance the visibility of the vehicle in traffic or around pedestrians. The elongated light source 102 may be adapted to extend from at or below the top of the vehicle frame.

The elongated light source 102 can include one or more active light sources or passive light sources. For example, the elongated light source 102 may comprise LEDs housed in a translucent plastic column, thereby serving as an active light source. In some embodiments, the elongated light source may comprise a reflective material that redirects light from other sources (e.g., headlights from a second vehicle), thereby serving as a passive light source. In some embodiments, all or substantially all of the elongated light source 102 is illuminated, either by emitting light generated by a light source housed within the column or reflecting light emitted by a distinct light source.

The elongated light source 102 is coupled, directly or indirectly, to a power supply 108. Examples of a power supply include, but are not limited to, a battery, a replaceable and/or rechargeable battery pack, a dynamo, a solar cell, some other regenerative power source, or any combination thereof. For example, the power supply may be a Joule™ 3 Dynamo Hub or a combination of rechargeable lithium ion or nickel-metal hydride (NiMH) batteries. The power supply 108 may be housed within the elongated light source 102 or the base 104. The vehicle light apparatus 100 may also utilize a vehicle's existing electrical power system (e.g., wheelchair, ATV, motorcycle). In one embodiment, the vehicle light apparatus 100 may utilize a dynamo to provide a primary source of power and one or more rechargeable batteries that continue to power the elongated light source 102 when the vehicle is not moving. The rechargeable batteries may also be adapted to be recharged via a universal serial bus ("USB") connection to a laptop, desktop computer, tablet, or power outlet converter.

FIG. 2 is a perspective view of a vehicle light apparatus 200 according to one embodiment. The vehicle light apparatus 200 may, in large part, be similar or identical to the vehicle light apparatus 100 of FIG. 1. For example, the vehicle light apparatus 200 may include an elongated light source 202 supported by a base 204 that is coupled, directly or indirectly, to a power supply 208, and one or more buttons 210, 212 that can be used to turn the power on/off, cycle through various lighting modes, etc. The elongated light source 202 and/or base 204 may include a quick-release mechanism (e.g., button 210, a turn-knob 216, threaded end connection (i.e., twist on/off), magnet) that allows the elongated light source 202 to be attached to and removed from the base 204. As shown in FIG. 2, in some embodiments the base 204 is fixedly attached to the vehicle frame using a clamp, a securing plate 214, screws and nuts, etc.

Figure 3A:
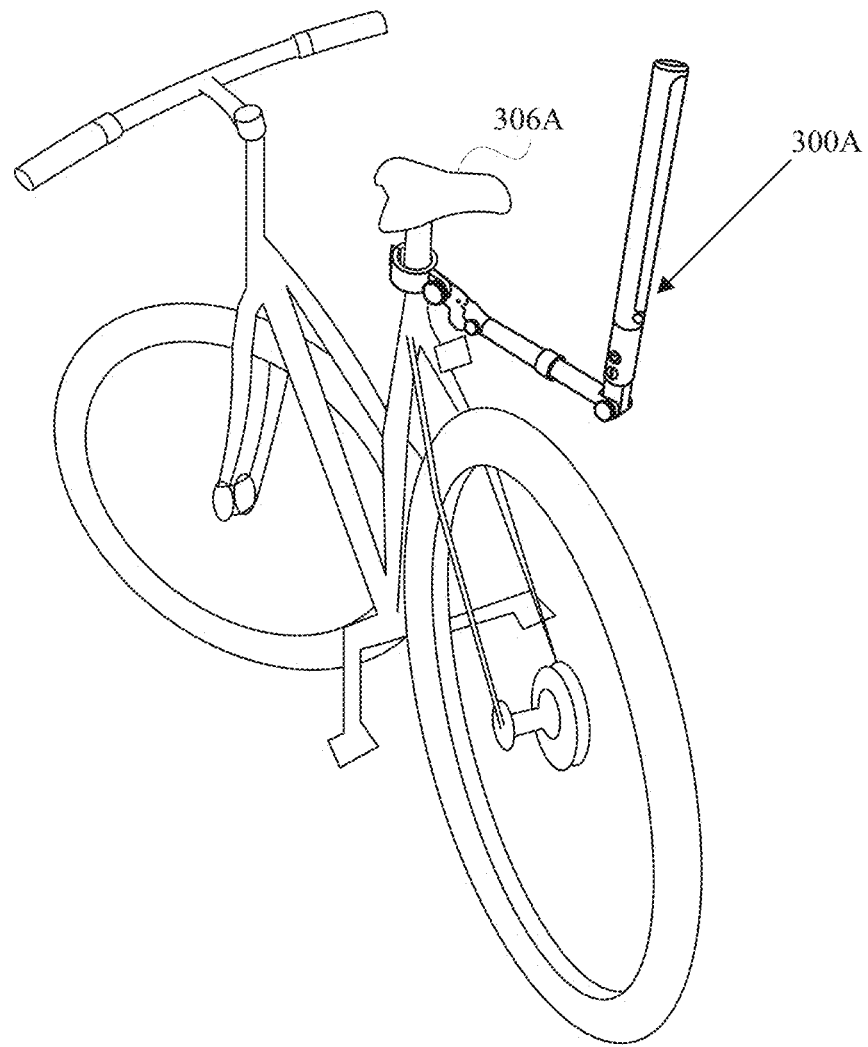
FIG. 3A is a perspective view of a vehicle light apparatus attached to a vehicle frame according to one embodiment of the disclosure.
Figure 3B:
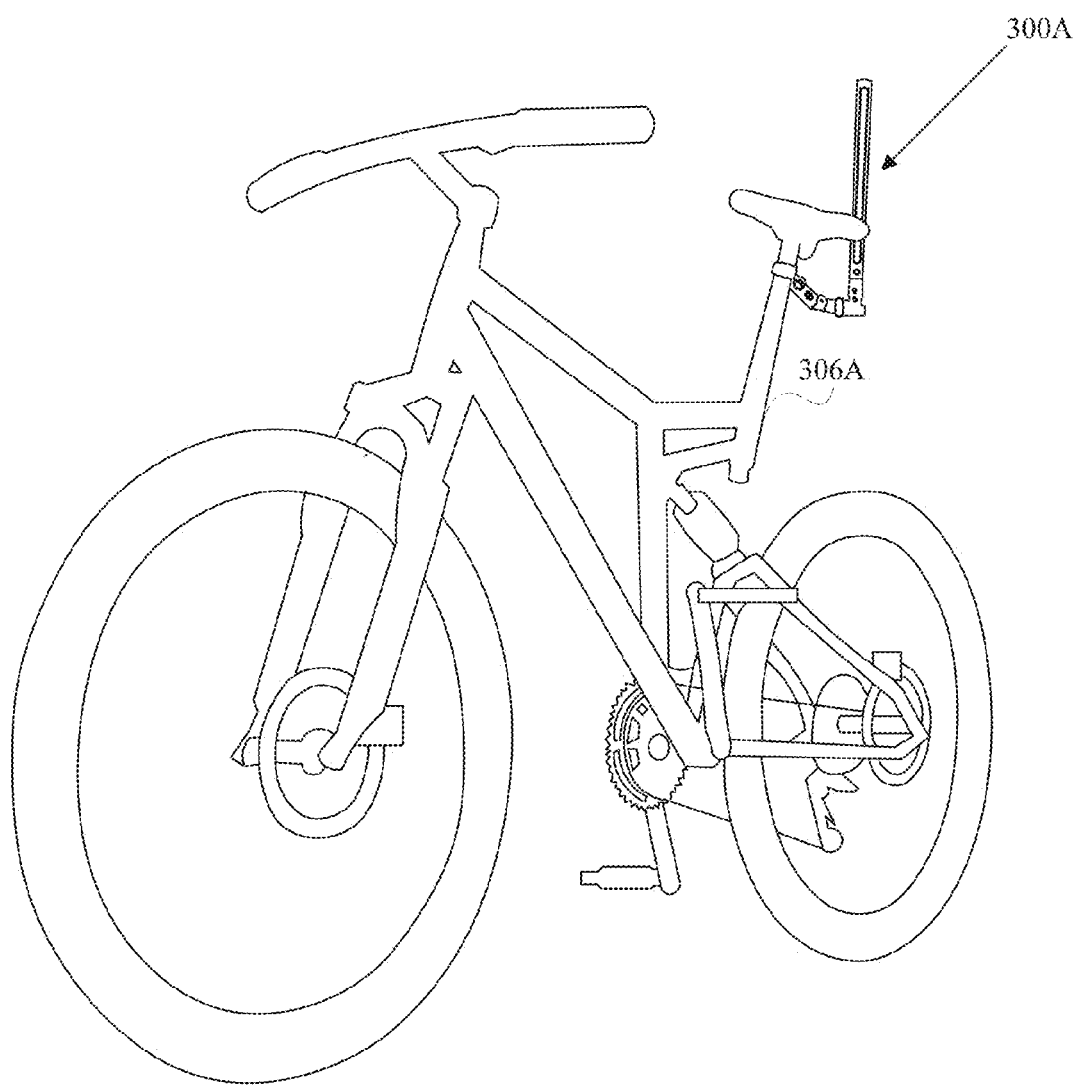
FIG. 3B is another perspective view of the vehicle light apparatus attached to the vehicle frame according to the embodiment of FIG. 3A.
Figure 3C:
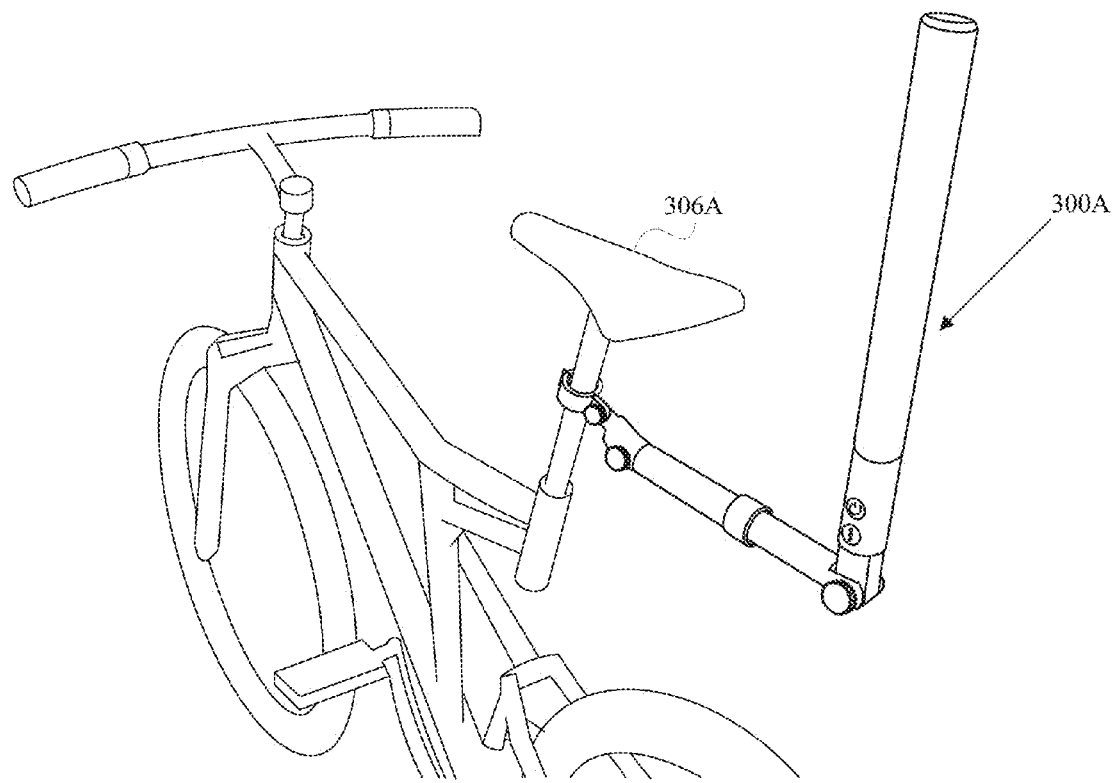
FIG. 3C is another perspective view of the vehicle light apparatus attached to the vehicle frame according to the embodiments of FIGS. 3A and 3B.
Figure 3D:
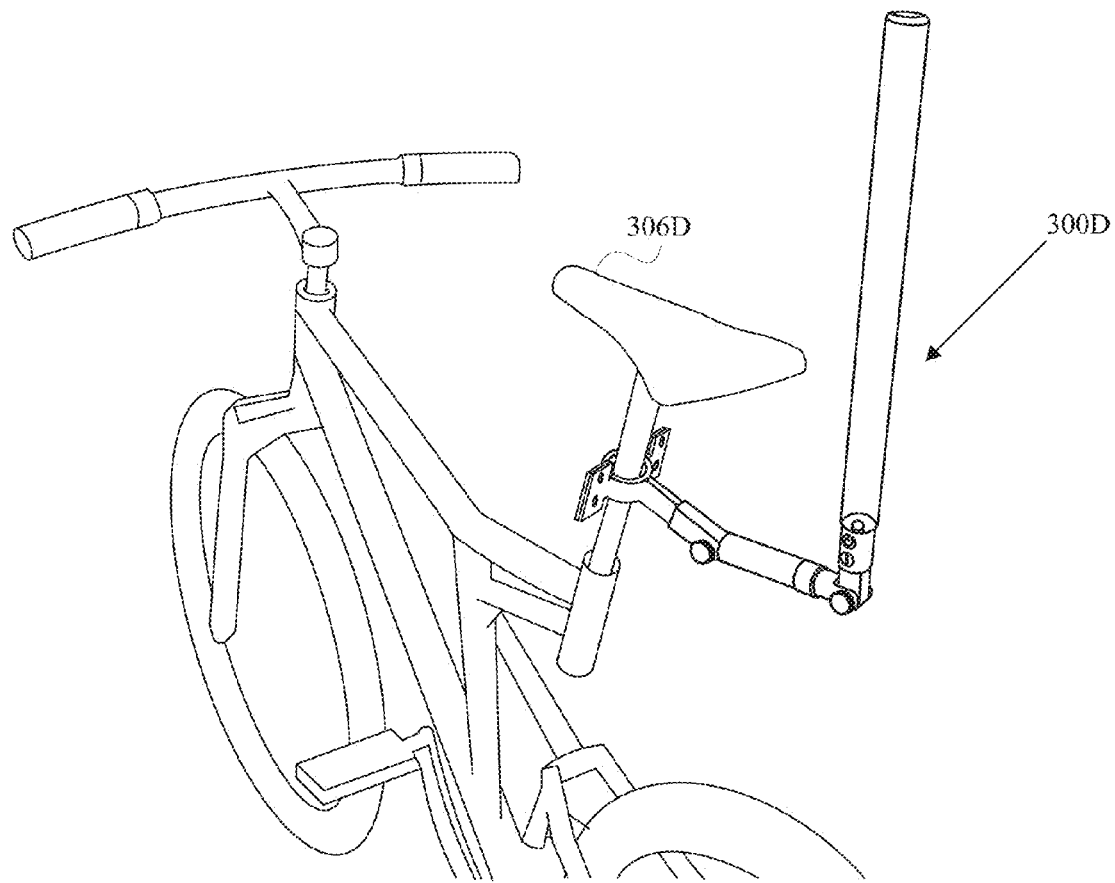
FIG. 3D is a perspective view of a vehicle light apparatus attached to a vehicle frame according to one embodiment of the disclosure.

FIGS. 3A, 3B, and 3C are perspective views of a vehicle light apparatus 300A attached to a vehicle frame 306A according to one embodiment of the disclosure. FIG. 3A illustrates the vehicle light apparatus 300A coupled directly to a vehicle frame 306A according to one of the preferred embodiments. Although the illustrated vehicle frame 306A is a bicycle, one skilled in the art will recognize that the vehicle light apparatus 300A could be attached to other vehicles. FIG. 3D is a perspective view of a vehicle light apparatus 300D according to one embodiment. Vehicle light apparatus 300A and vehicle light apparatus 300D may collectively be referred to as "vehicle light apparatus 300," and vehicle frame 306A and vehicle frame 306D may collectively be referred to as the vehicle frame 306. The vehicle frame 306 can be adapted for a rider. The vehicle light apparatus 300 can be vehicle light apparatus 100 of FIG. 1 or vehicle light apparatus 200 of FIG. 2. In some embodiments, the design and/or structure of the vehicle light apparatus changes based on the type of user (e.g., children, adults) and/or type of bicycle (e.g., mountain, touring). The vehicle light apparatus 300 is, preferably, configured to be flexible. The flexible mechanism may be implemented in a variety of ways including, but not limited to, the embodiments of FIG. 4A, 4B, and 4C described below.

Figure 4A:
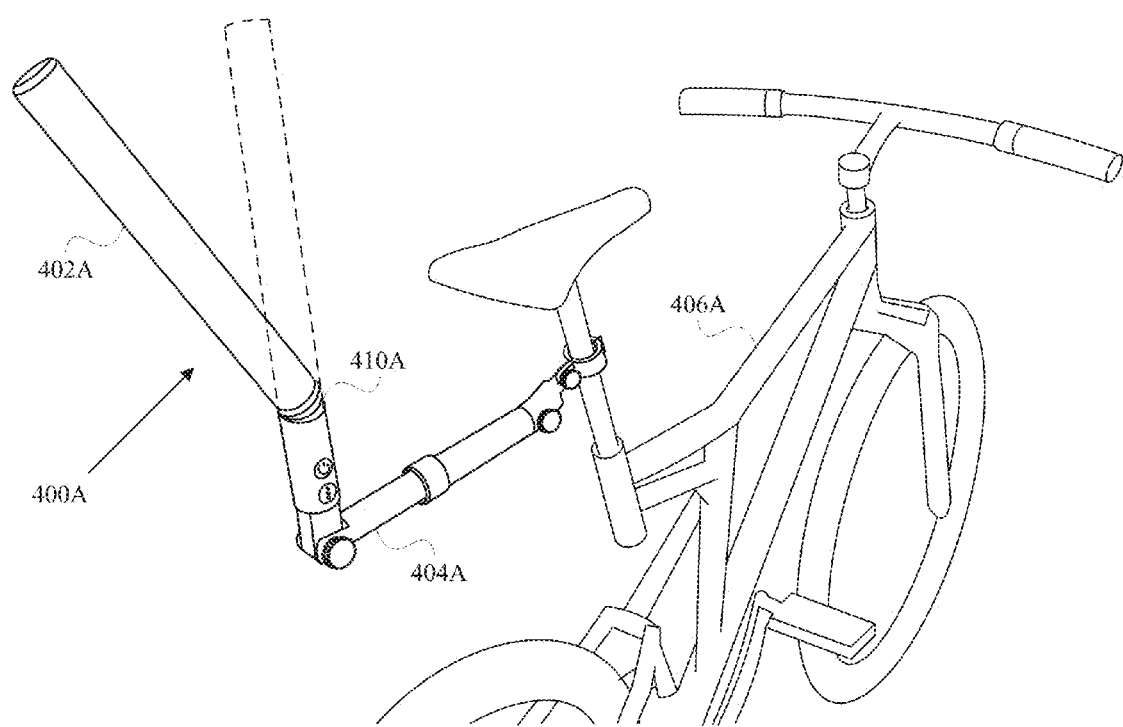
FIG. 4A is a perspective view of a pivoting vehicle light apparatus attached to a vehicle frame according to one embodiment of the disclosure.

FIG. 4A is a perspective view of a vehicle light apparatus 400A pivoting according to one embodiment. In some embodiments, the elongated light source 402A may include a housing that is entirely inflexible. For example, the elongated light source 402A may include a solid polycarbonate housing that is adapted to pivot from the base 404A. The entirety of the elongated light source 402A can be displaced when sufficient force is applied. Examples of a pivot mechanism 410A include, but are not limited to, a central pivot joint, a compression spring, a universal joint, a bellows expansion joint made from metal and/or plastic, a ball joint, etc. One skilled in the art will recognize that the pivot mechanism may also be implemented where the base 404A is connected to the vehicle frame 406A.

Figure 4B:
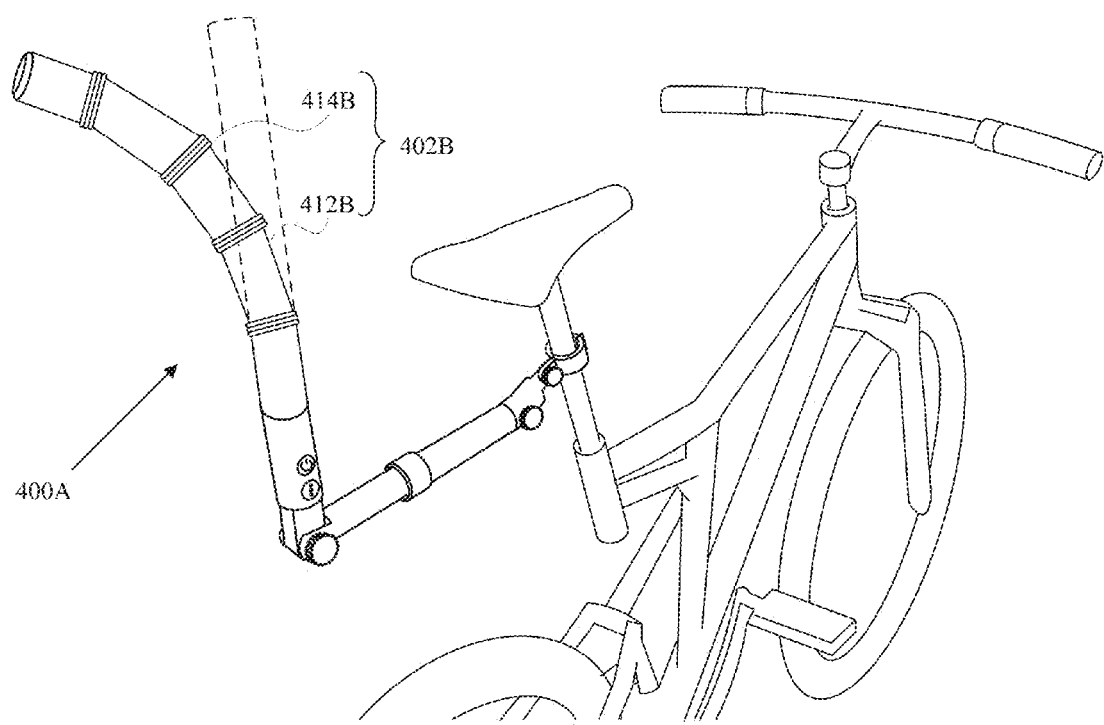
FIG. 4B is a perspective view of a flexible vehicle light apparatus attached to a vehicle frame according to one embodiment of the disclosure.

FIG. 4B is a perspective view of a vehicle light apparatus 400B flexing according to one embodiment. In some embodiments, an elongated light source 402B is constructed of a segmented rigid material 412B linked by flexible material 414B. The flexible material 414B may be selected such that the elongated light source 402B is able to warp under pressure from a human thigh moving over the elongated light source 402B and unwarp upon removal of the human thigh without breaking.

Figure 4C:
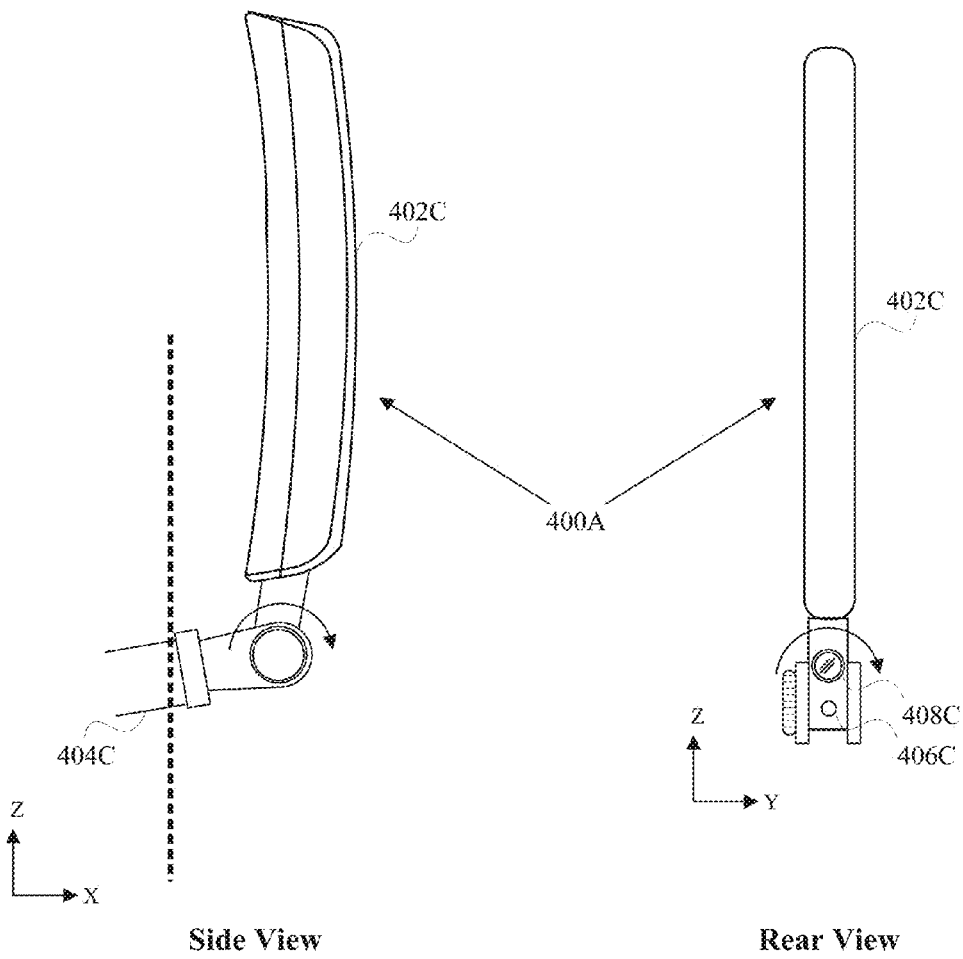
FIG. 4C is a side view and rear view of a vehicle light apparatus pivoting according to one embodiment of the disclosure.

FIG. 4C is a side view and a rear view of a vehicle light apparatus 400C pivoting according to one embodiment. In some embodiments, the elongated light source 402C and/or base 404C includes a dual spring pivot that allows the elongated light source 402C to pivot in at least two planes (e.g., ZX plane, ZY plane). In some circumstances, a dual spring pivot can provide greater durability and more stability with respect to knockback force in comparison to a single spring hinge or pivot. One skilled in the art will recognize that the dual spring pivot may also be implemented where the base 404C is connected to the vehicle frame.

Illustrated in FIGS. 4A, 4B, and 4C are examples of making the vehicle light apparatuses 400A, 400B, 400C (collectively referred to as "vehicle light apparatus 400") flexible enough for a rider to mount the vehicle without breaking the elongated light source 402A, 402B, 402C (collectively referred to as "elongated light source 402"). In each of the illustrated embodiments, the elongated light source 402 can be configured to extend above the vehicle frame in a vertical orientation and move upon experiencing pressure, wherein upon removal of said pressure the elongated light source 402 returns to the vertical orientation. Other embodiments of vehicle light apparatus 400 are also contemplated in this disclosure in any combination of the elongated light source 402 being a rigid pole, a semi-flexible pole, or a flexible pole, and the base 404A, 404B, 404C being flexible, pivoting, or rigid. For example, in some embodiments the elongated light source is made of a shape-memory alloy (e.g., memory metal) that is a furlable and unfurlable. The elongated light source can be furled and unfurled manually (e.g., by the rider's own hands) or automatically (e.g., by a remote control, by a computer system). When the elongated light source is configured to furl/unfurl automatically, one or more sensors may be incorporated into the vehicle light apparatus that cause the elongated light source to furl/unfurl. For example, a pressure sensor may be integrated into the vehicle's seat, a radio-frequency identification (RFID) sensor may be integrated into the vehicle light apparatus, or an optical sensor may be integrated into the base or elongated light source that is positioned to sense whether a rider is sitting in the seat of the vehicle.

In some embodiments, the vehicle light apparatus 400C includes one or more other sensors 406C configured to sense local temperature, sense proximity of other vehicles (e.g., how close a trailing vehicle is), determine location, etc. For example, the vehicle light apparatus may include a sensor 406C that registers the occurrence of a collision and places a call, sends an email, transmits a text message or notification, etc., to a designated recipient. Sensors 406C can be included that track average trip speed, speed in particular situations or locations (e.g., hills, city), total distance traveled, total trip time, location (e.g., GPS), weather conditions, current speed, etc. The sensor 406C may contain a module (e.g., wireless communication module) or be communicatively coupled to a communication module or computer system (e.g., computer system 1600 of FIG. 16) that relays the information described above to a smart phone, tablet, personal computer, server, etc. In some embodiments, this information is relayed to a distinct display device or smart phone that is connected to the vehicle and/or is viewable to the rider. The vehicle light apparatus 400C can also include a vision sensor or camera 408C that is incorporated into or coupled to the elongated light source or the base. The vision sensor can be adapted for infrared imaging, thermal imaging, etc. For example, a rear-facing camera 408C, which is incorporated into the base, may relay real-time video to a distinct display device or a smart phone that is mounted to the vehicle (e.g., mounted to the handlebars of a bicycle). The camera 408C can be positioned to capture the area behind the vehicle while the vehicle travels in reverse, record a trip (e.g., side view, rider's view), record accidents (e.g., hit and run, theft), etc.

In some embodiments, a computer system coupled to a proximity sensor can cause the camera 408C to record. For example, the camera 408C may begin to record when the proximity sensor detects a distinct entity (e.g., another vehicle) behind, in front of, or alongside the vehicle. In some embodiments, the rider is able to give feedback to help the system learn over time to improve detection accuracy. The elongated light source 402 and/or the base 402C may include a microphone and a speaker that allow for additional interactions with the rider. The rider may use the microphone to record voice alerts, sense ambient noise, etc. The speaker may provide sound alerts to the rider, another vehicle (e.g., following car), a third party (e.g., in case of potential theft), etc. In various embodiments, some combination of the sensors 406C, camera 408C, microphone, and speaker can be operated remotely. For example, the camera could be controlled by a remote control, a web application on a web browser, a mobile application, etc., that allow for remote (e.g., parental) monitoring.

The recording, which may have captured a potential or actual collision, can be stored in internal or external memory. For example, the recording can be stored in a storage medium within the vehicle light apparatus 400 (e.g., storage module or memory within a computer system). As another example, the recording may be stored in a remote storage that is communicatively coupled to the vehicle light apparatus 400 (e.g., storage module or memory of display devices 1502 of FIG. 15). The remote storage can be communicatively connected to the vehicle light apparatus 400 over a network (e.g., Internet, Bluetooth, a local area network, a wide area network, a point-to-point dial-up connection). In some embodiments, the recording is transmitted to cloud storage, a network-accessible device associated with the rider (e.g., smartphone, tablet, laptop), or transmitted (e.g., Short Message Service (SMS) message, email) to a third party or another device.

The network can also be used to send alerts (e.g., email notification, SMS messages, notifications) to the rider or a third party. In some embodiments, the rider can choose which alerts to receive. For example, the rider may elect to receive security alerts, but refuse alerts regarding weather and total distance traveled.

Figure 5:
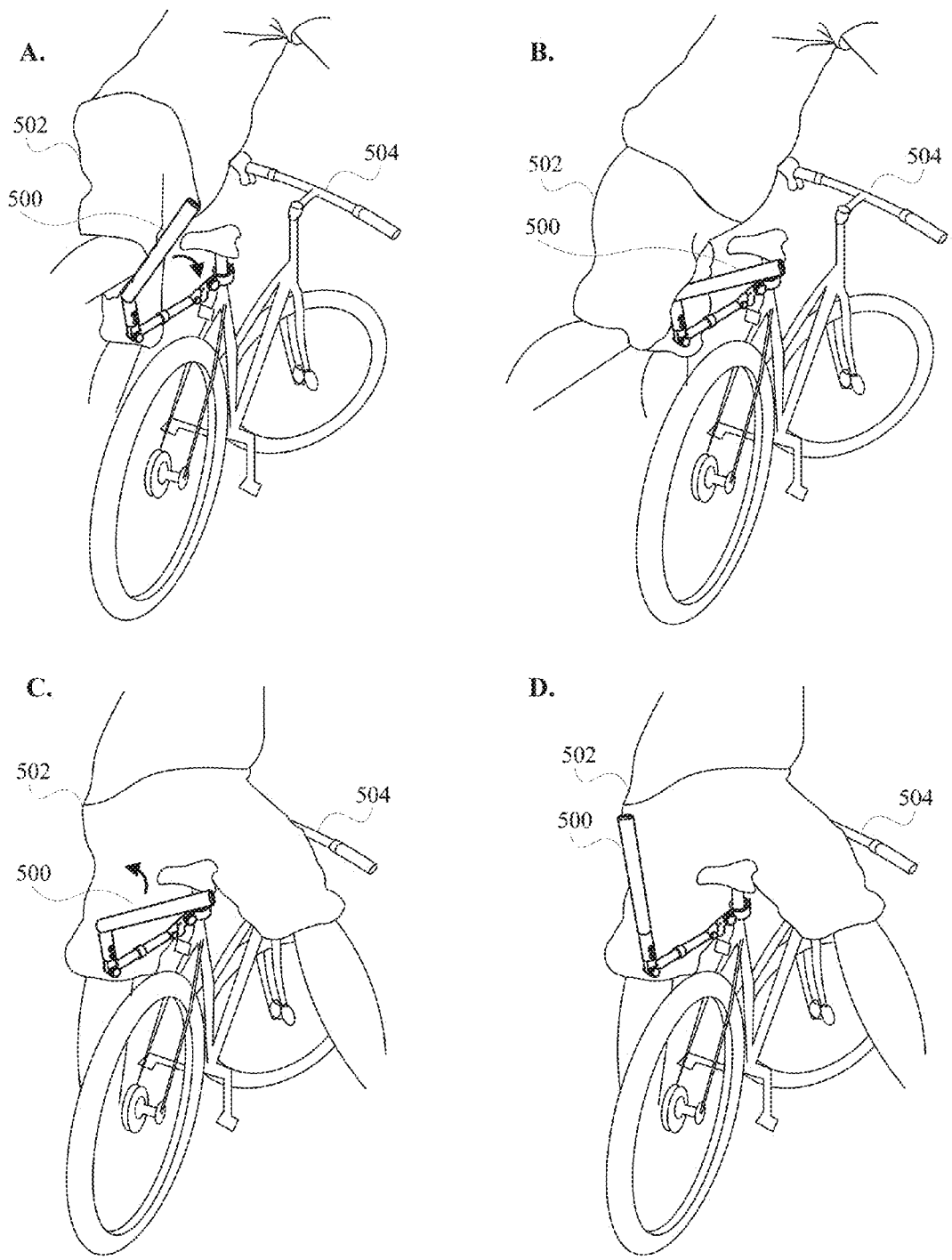
FIG. 5 is a series of pictures that illustrate how a vehicle light apparatus can be displaced by the pressure of a user's leg according to one embodiment of the disclosure.

FIG. 5 is a series of pictures that illustrate how, in one embodiment, a vehicle light apparatus 500 is displaced when pressure is applied by a rider's leg 502. Beginning with picture A, a rider 502 mounts the vehicle 504. The vehicle 504 is a bicycle in this example. However, one skilled in the art will recognize that the vehicle 504 need not be a bicycle. At picture B, the rider's leg 502 extends over the vehicle light apparatus 500. As the rider's leg 502 applies pressure to the vehicle light apparatus 500, the vehicle light apparatus 500 is displaced (e.g., moves downward). As described above, various features can be implemented that permit warping or displacement (e.g., pivot mechanism, flexible materials). Regardless of the physical structure, the vehicle light apparatus 500 is not damaged when it is displaced by the rider's leg 502 or any other pressure. At picture C, the vehicle light apparatus 500 hesitates momentarily after the rider's leg 502 extends over and clears the vehicle light apparatus 500. At picture D, the vehicle light apparatus 500 returns to its original position.

Figure 6A:
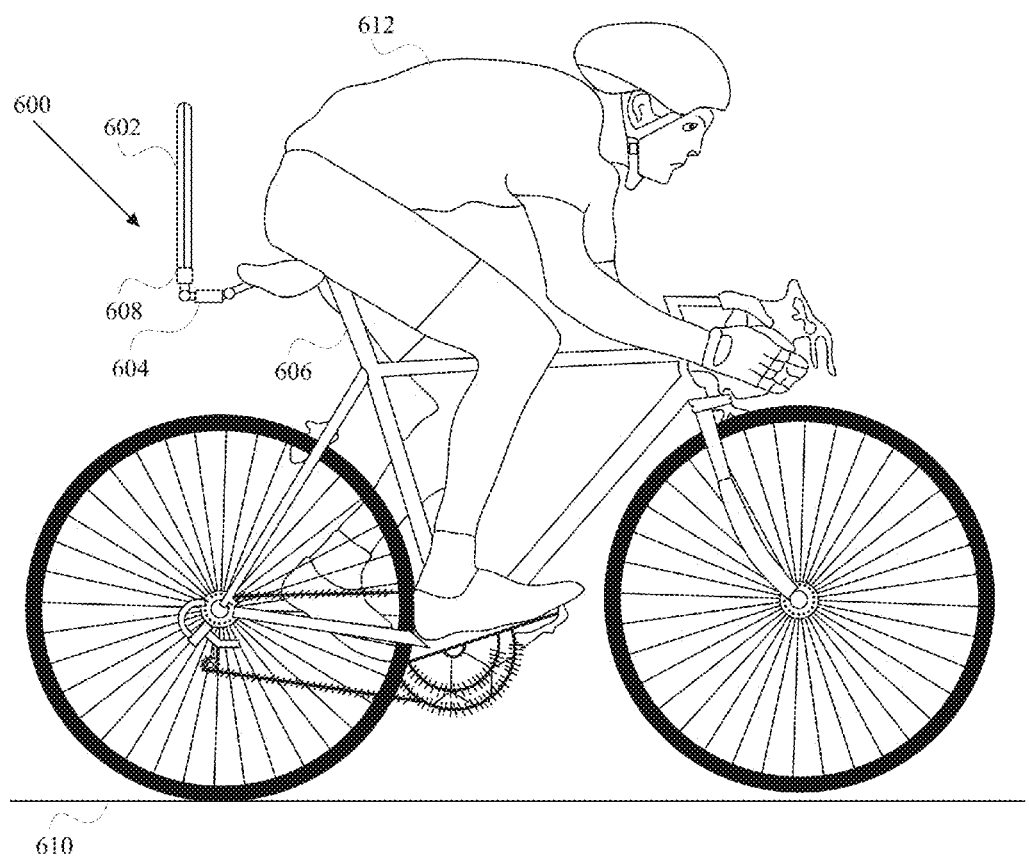
FIG. 6A is a side view of a vehicle light apparatus attached to a bicycle according to one embodiment of the disclosure.

FIG. 6A is a side view of a vehicle light apparatus 600 attached to a vehicle according to one embodiment. The vehicle light apparatus 600 can be, for example, the vehicle light apparatus 100 of FIG. 1. The vehicle light apparatus 600 can be configured to mount to a vehicle frame 606. The illustrated vehicle frame 606 is a bicycle frame; however, other possible vehicles include, but are not limited to, a wheelchair, recumbent bicycle, trike, motorcycle, ATV, or any other vehicle that is mountable by a rider 612. The vehicle light apparatus 600 includes a base 604 adapted to connect to a vehicle frame 606, a power supply 608, and an elongated light source 602 supported by the base 604 and coupled, directly or indirectly, to the power supply 608. The base 604 can be adapted to connect to a particular vehicle frame 606 (e.g., a bicycle). The base 604 may be detachably connected or fixedly attached to the vehicle frame 606. In some embodiments, the elongated light source 602 is detachably connectable to a rear rack attached to the vehicle frame 606, worn by the rider 610 (e.g., backpack, sweatshirt), etc. For example, the elongated light source 602 may attach to a backpack using one or more clips, Velcro, hooks, magnets, etc. In various embodiments, the elongated light source 602 is adapted to extend above the vehicle frame 606 with respect to a surface 610 the vehicle frame 606 is to traverse thereon. The extension raises and expands the vehicle's visibility profile, improves visibility of the rider and the rider's safety, and reduces the incidence of collisions with other vehicles.

Figure 6B:
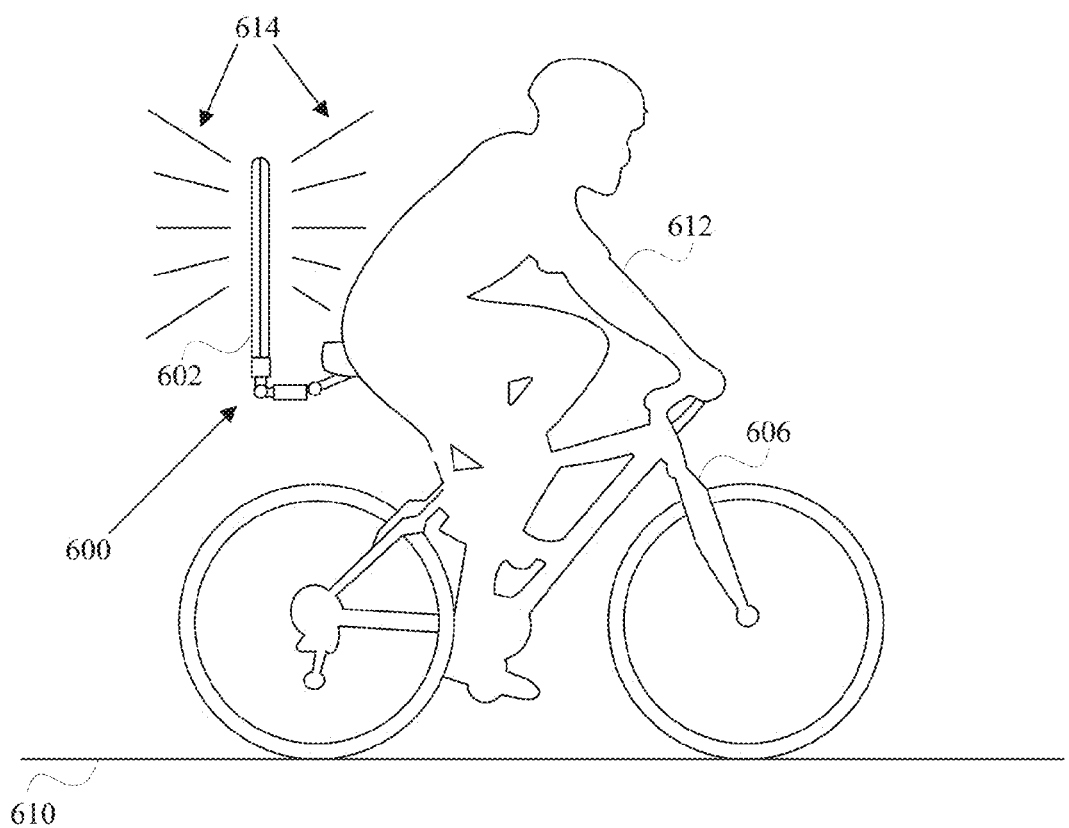
FIG. 6B is a side view of a vehicle light apparatus that generates an illumination field according to the embodiment of FIG. 6A.

FIG. 6B is a side view of a vehicle light apparatus 600 that includes an illumination field 614. The elongated light source 602 can be configured to provide light within the profile of the vehicle (e.g., inside the vehicle frame 606). In some embodiments, the elongated light source 602 is adapted to provide illumination in 180 degrees or greater. However, the elongated light source 602 can be adapted to provide illumination in any range up to 360 degrees. In some embodiments, the rider 612 can switch between two or more illumination ranges. For example, the rider 612 may manually switch between 180 degree and 360 degree illumination depending on the ambient light level. In some embodiments, a computer system (e.g., computer system 1600 of FIG. 16) automatically switches the illumination settings (e.g., range, intensity) based on information conveyed by one or more sensors (e.g., light detection sensor, motion sensor). The elongated light source 602 may be adapted to provide a substantially uniform illumination, an irregular illumination pattern, or any combination thereof. In some embodiments, the elongated light source 602 may be configured to emit light of different colors in one or more directions. For example, the elongated light source 602 may include LEDs that face one direction (e.g., behind the vehicle) and emit different colors based on the actions of the driver and/or vehicle (e.g., braking, turning). As another example, the elongated light source 602 may include a first set of LEDs that face one direction (e.g., behind the vehicle) and emit a first color (e.g., red) and a second set of LEDs that face a second direction (e.g., towards the rider) and emit a second color (e.g., white). In the embodiments shown in FIGS. 6A and 6B, the elongated light source 602 is configured to move upon receiving pressure and, upon removal of said pressure, return to an original vertical orientation with respect to the surface 610 the vehicle frame 606 is to traverse thereon. In some embodiments, the vehicle light apparatus 600 includes a support bracket that attaches to one or more elements (e.g., seat under-framework or support rods) under the seat (e.g., of a bicycle or wheelchair).

Figure 7A:
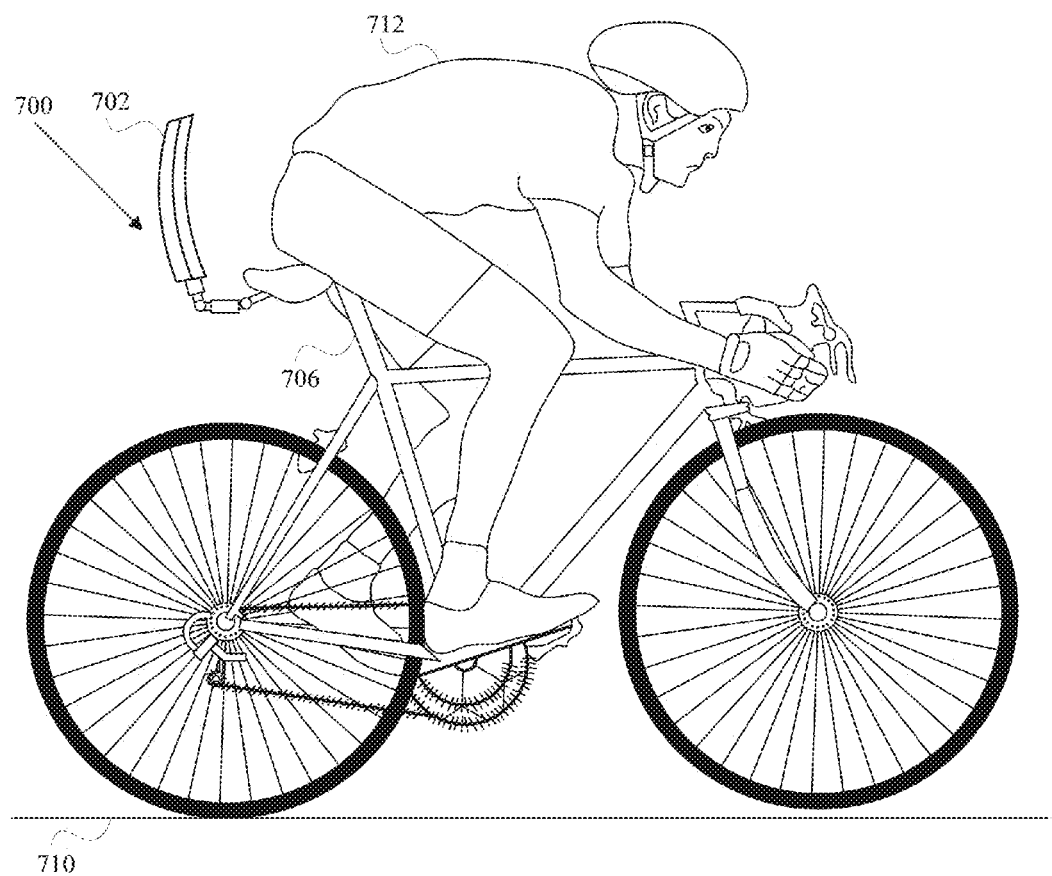
FIG. 7A is a side view of a vehicle light apparatus attached to a bicycle according to one embodiment of the disclosure.

FIG. 7A is a side view of a vehicle light apparatus 700 attached to a vehicle according to various embodiments. In some embodiments, the elongated light source 702 is curved such that it follows the contour of the rider 712. In various embodiments, the elongated light source 702 may be a flexible or rigid curved column as described above with respect to FIGS. 4A and 4B. A curved elongated light source 702 can be configured to move upon experiencing pressure from a human body and, upon removal of said pressure, return to an original position with respect to the surface 710 the vehicle frame 706 is to traverse thereon. Alternatively, the elongated light source 702 can be constructed of a segmented rigid material linked by flexible material. The flexible material may be selected to warp under a human thigh moving over the elongated light source 702 and unwarp upon removal of the human thigh without breaking the elongated light source 702.

Figure 7B:
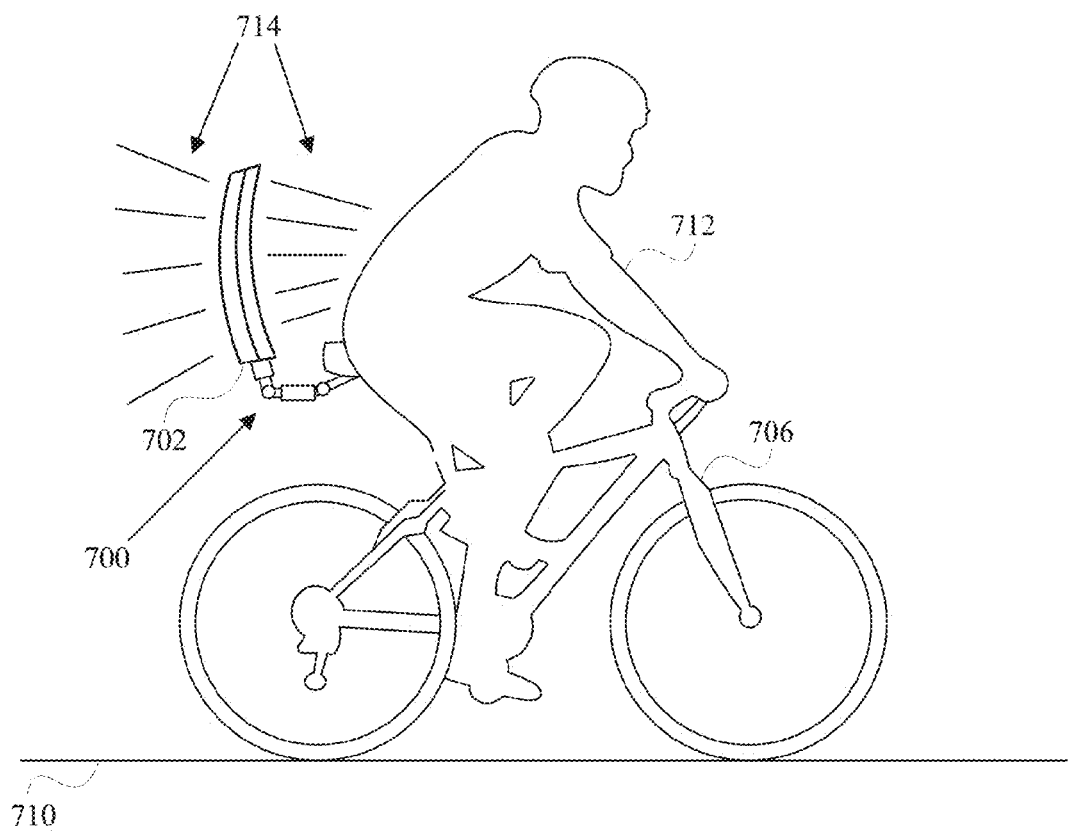
FIG. 7B is a side view of a vehicle light apparatus that generates an illumination field according to the embodiment of FIG. 6B.

FIG. 7B is a side view of a vehicle light apparatus 700 that includes an illumination field 714. As described above with respect to FIG. 6B, the elongated light source 702 may be adapted to provide illumination in any range up to 360 degrees. In some embodiments, the elongated light source 702 includes one or more LEDs configured to emit one or more colors in one or more directions. The elongated light source 702 can include a light source (e.g., LED, bulbs) that emits light and a light reflector configured to reflect light emitted by the light source, light emitted by a distinct source (e.g., another vehicle), or some combination thereof. In some embodiments, all or substantially all of the elongated light source 702 is illuminated, either by emitting light generated by a light emitter housed within the elongated light source 702 or by reflecting light emitted by a distinct light source (e.g., another vehicle).

Figure 8:
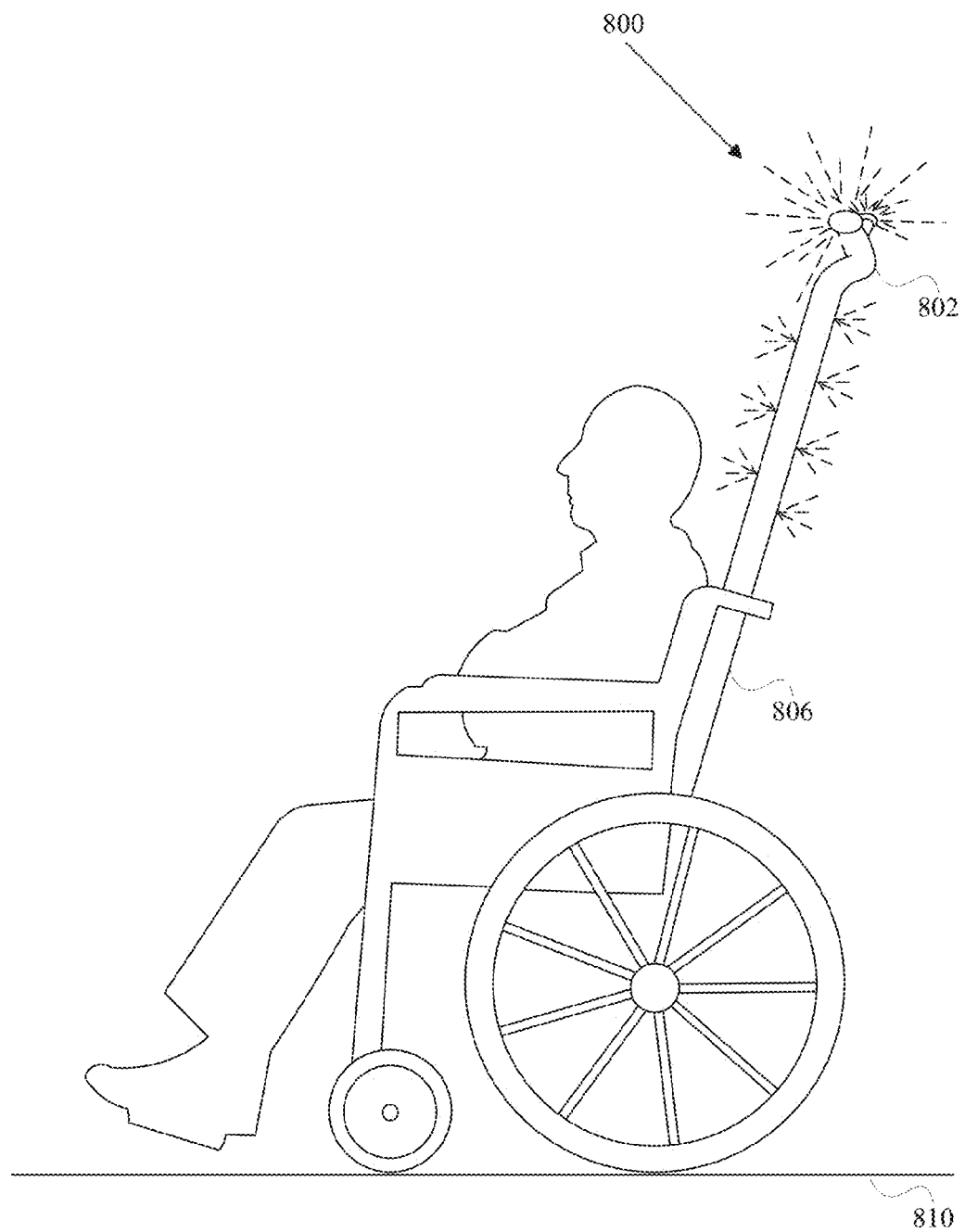
FIG. 8 is a side view of a vehicle light apparatus attached to a wheelchair according to various embodiments of the disclosure.

FIG. 8 is a side view of a vehicle light apparatus 800 attached to a vehicle according to various embodiments. The illustrated vehicle frame 806 is a wheelchair. However, other possible vehicles include, but are not limited to, a bicycle, motorcycle, recumbent bicycle, ATV, moped, scooter, or trike. In one embodiment, the elongated light source 802 is adapted to extend above the vehicle frame 806 with respect to a surface 810 the vehicle frame 806 is to traverse thereon. In various embodiments, the elongated light source may be configured in a "Y" or "T" shape, wherein the arms of the "Y" or "T" form the elongated light source 802. In some embodiments, the stem of the "Y" or "T" may also emit light and be part of the elongated light source 802. The elongated light source 802 of FIG. 8 is adapted to provide illumination in 180 degrees or greater; however, the elongated light source 802 can provide illumination in any range up to 360 degrees. The elongated light source 802 may be adapted to provide a substantially uniform illumination, an irregular illumination pattern, or any combination thereof. Similarly, the elongated light source 802 may also be adapted such that the arms of the "Y" or "T" can be intensified together, in programmed patterns, or in random patterns. In some embodiments, the elongated light source 802 is configured to illuminate the entire stem of the "Y" or "T." Alternatively, the elongated light source 802 may be configured to illuminate one or more portions of the stem. In some embodiments, the elongated light source 800 includes one or more light sources (e.g., LEDs, bulbs) configured to emit light in one or more directions. For example, FIG. 8 illustrates the arms of the "Y" as emitting light towards the sides of the vehicle frame 806. However, one skilled in the art will recognize the arms of the "Y" could be configured to emit light in a different direction (e.g., forward and backward). In some embodiments, the elongated light source 800 includes one or more light sources (e.g., LEDs, bulbs) configured to emit light of different colors or intensities. For example, the stem of the "Y" may emit white light, while the arms of the "Y" may emit red light.

Figure 9:
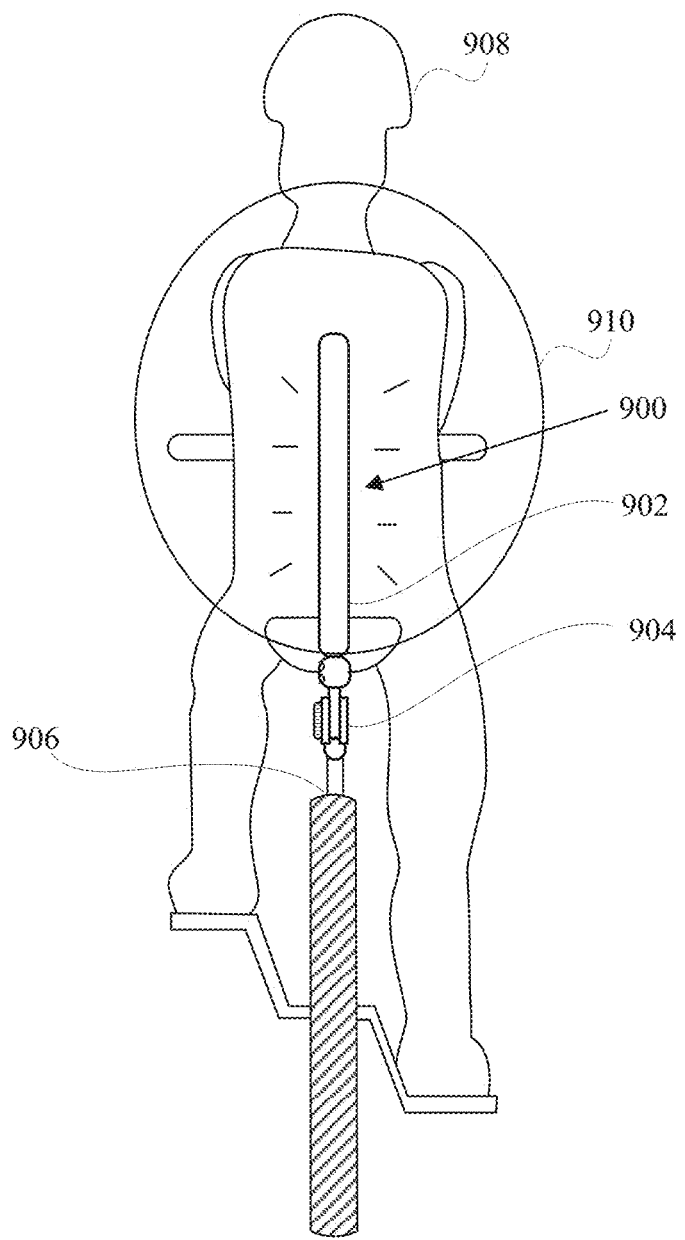
FIG. 9 is a rear view of a vehicle light apparatus and illumination field according to one embodiment of the disclosure.

FIG. 9 is a rear view of a vehicle light apparatus 900 and illumination field 910 according to one embodiment. In some embodiments, the elongated light source 902 is positioned to emit light towards a rider 908 of the vehicle so light is reflected by the rider 908 to generate a larger illumination field 910. The elongated light source 902 may provide uniform illumination or an irregular illumination pattern, such that reflected light provides a softer, more natural illumination field 910. A larger illumination field 910 expands the vehicle's visibility profile, thereby improving visibility of the vehicle and reducing the incidence of collisions with other vehicles. Light source intensity or light emitter type may be chosen and modified in order to increase visibility at large distances.

As described above, the elongated light source 902 can include more than one light source that emit different colors, in different directions, etc. For example, the elongated light source 902 may include a first light source that emits red light toward the rear of the vehicle and a second light source that emits white light toward the rider 908 of the vehicle. The base 904 can be adjusted (e.g., tilted, rotated) to position the vehicle light apparatus 900 in a particular direction or orientation. The vehicle light apparatus 900 may also be adapted to allow attachment of off-the-shelf safety lights or a specially-designed light to the top, bottom, and/or side of the elongated light source 902, base 904, or both. In some embodiments, the intensity and/or pattern emitted by the elongated light source 910 is triggered by the rider and/or the vehicle. For example, the intensity of the elongated light source 910 may increase when the rider applies pressure to the brakes. Similarly, the elongated light source 910, or a portion thereof, may change pattern (e.g., blinking) when the vehicle begins to turn left or right.

In some embodiments, the vehicle light apparatus 900 is controlled by the rider 908 via a remote control. The remote control may allow the rider to turn the vehicle light apparatus 900 on/off and cycle through a variety of modes, including, but not limited to, constant on, constant rate of blinking, and random blinking. The elongated light source 902 may also include an extra row or column of lights that intensify when the rider utilizes the brakes or begins to turn. The light sources of the elongated light source 902 can be intensified together, in programmed patterns, or in random patterns. In some embodiments, the vehicle light apparatus 900 comprises two or more elongated light sources 902 mounted adjacently or in other symmetrical or non-symmetrical relationships. If two or more vehicle light apparatuses 900 are coupled, directly or indirectly, together, the elongated light sources 902 may be configured to flash or illuminate any pattern in unison.

In some embodiments, the vehicle light apparatus 900 is configured to sync to a vehicle's brake and/or turn lights. For example, the entirety of the elongated light source 902 may intensify when a rider 908 is braking or one or more side portions of the elongated light source 902 may activate to indicate turn direction. The vehicle light apparatus 900 may be synchronized, wired or wirelessly, to additional lights positioned elsewhere on the vehicle frame 906 (e.g., saddle/seat rail, handlebar) and/or rider 908 (e.g., back of helmet, backpack). The elongated light source 902 may also include different color signals corresponding to different functions or actions. For example, red LEDs may indicate braking, while yellow LEDs may indicate turn direction.

Figure 10:
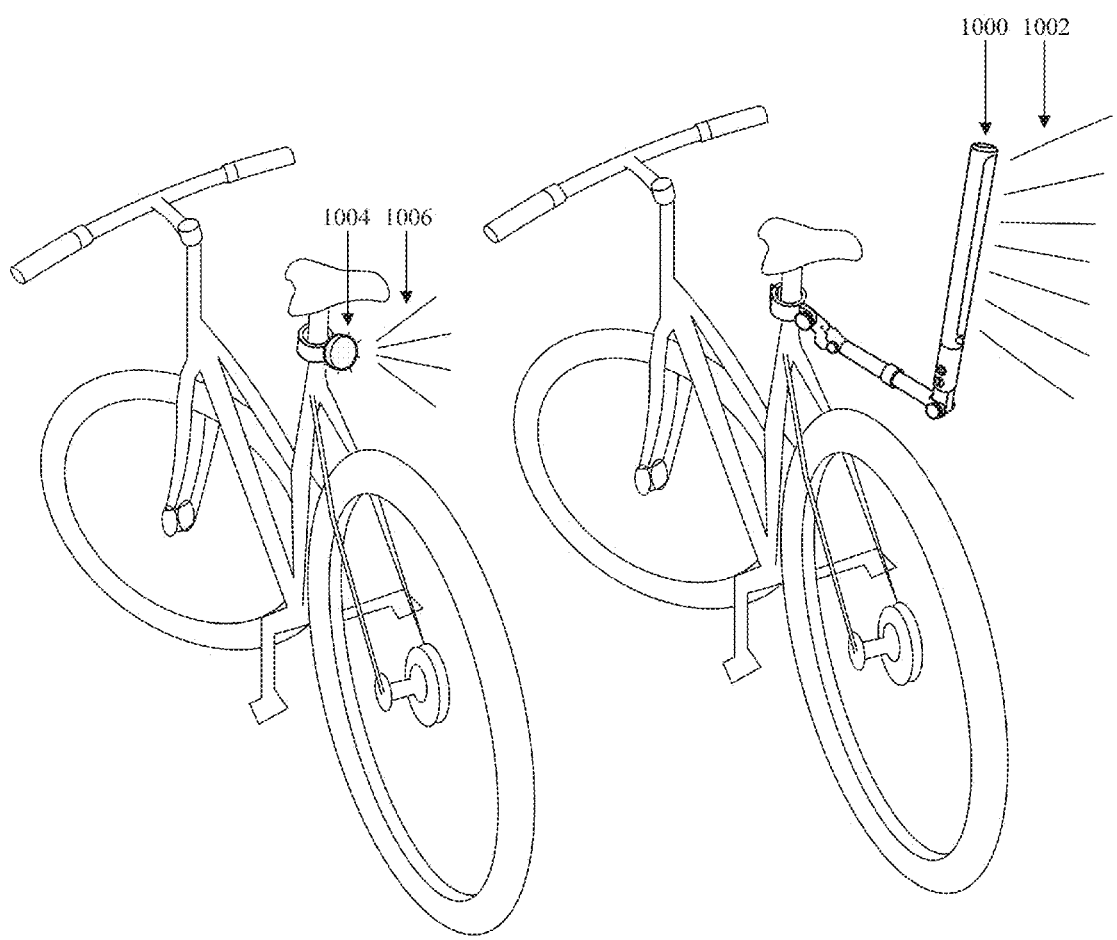
FIG. 10 is a comparison of an illumination field for a conventional bicycle taillight and an illumination field for a vehicle light apparatus according to one embodiment of the disclosure.

FIG. 10 is a comparison of an illumination field 1006 for a conventional bicycle taillight 1004 and an illumination field 1002 for a vehicle light apparatus 1000 according to one embodiment. One skilled in the art will recognize that the vehicle light apparatus 1000 increases the visibility profile of a vehicle by elevating an elongated light source above the vehicle frame. For example, when equipped to a bicycle, as shown in FIG. 10, the vehicle light apparatus 1000 is situated at or substantially near a height that increases the likelihood drivers of other vehicles (e.g., cars) will notice. By being elongated, the vehicle light apparatus 1000 is also able to generate a much larger illumination field 1002 in comparison to the illumination field 1006 generated by a conventional bicycle taillight 1004.

Figure 11:
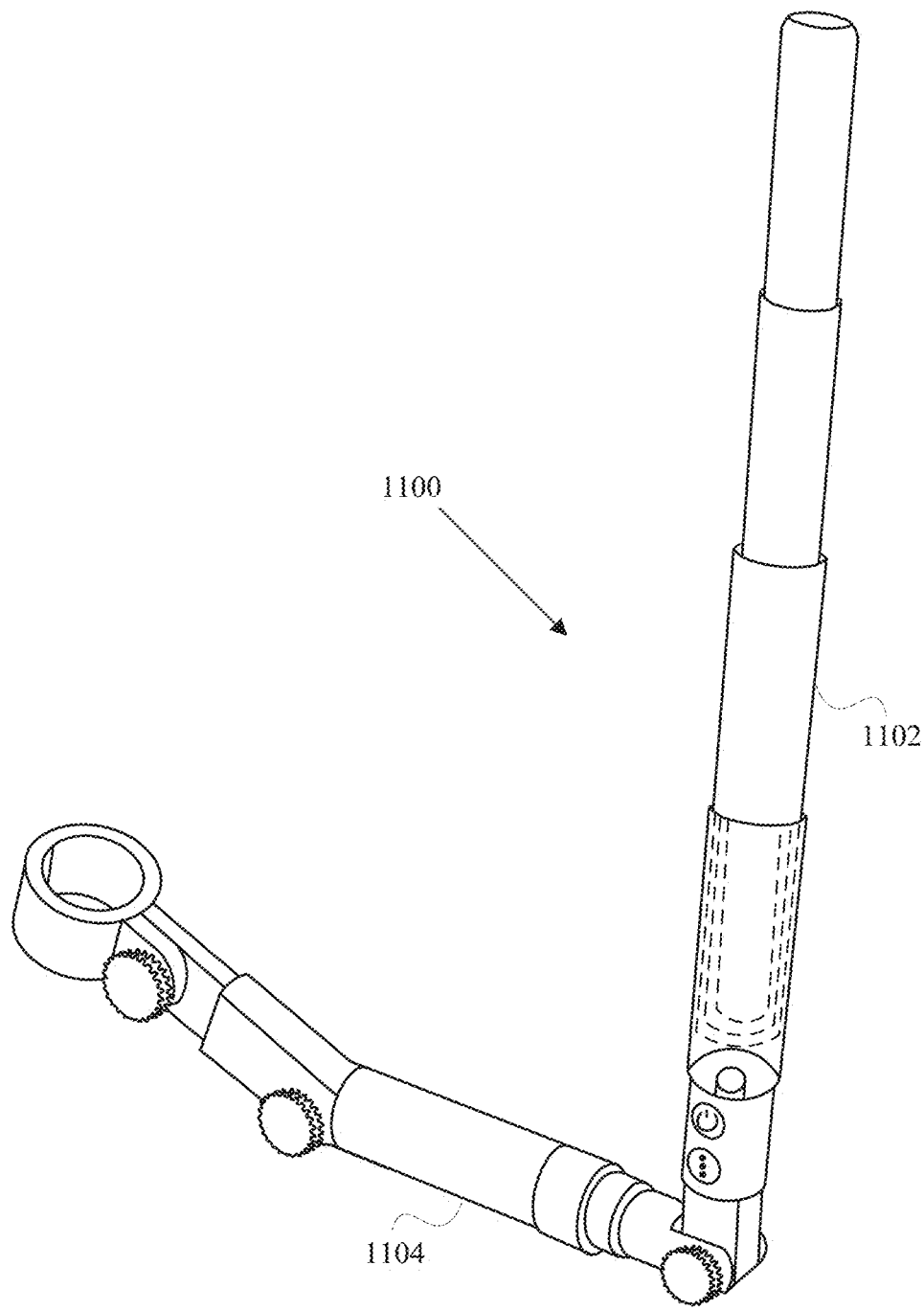
FIG. 11 is a perspective view of a vehicle light apparatus according to one embodiment of the disclosure.

FIG. 11 is a perspective view of a vehicle light apparatus 1100 according to one embodiment. The vehicle light apparatus 1100 can, for example, be similar to the vehicle light apparatus 100 of FIG. 1. In various embodiments, the vehicle light apparatus 1100 is adapted to attach to a vehicle frame. In some embodiments, an elongated light source 1102 includes a telescoping mechanism such that the elongated light source 1102 is configured to extend above the vehicle frame when fully protracted and is more compact when fully retracted, which makes the vehicle light apparatus 1100 substantially easier to store, carry, and transport. In some embodiments, the base 1104 and/or elongated light source 1102 includes a quick-release button, turn-knob, threaded end connection (i.e., twist on/off), magnet, etc., that allows the elongated light source 1102 to be attached to and removed from the base 1104. One skilled in the art will appreciate that the elongated light source 1102 may be configured to retract into different positions, including into the base 1104.

Figure 12:
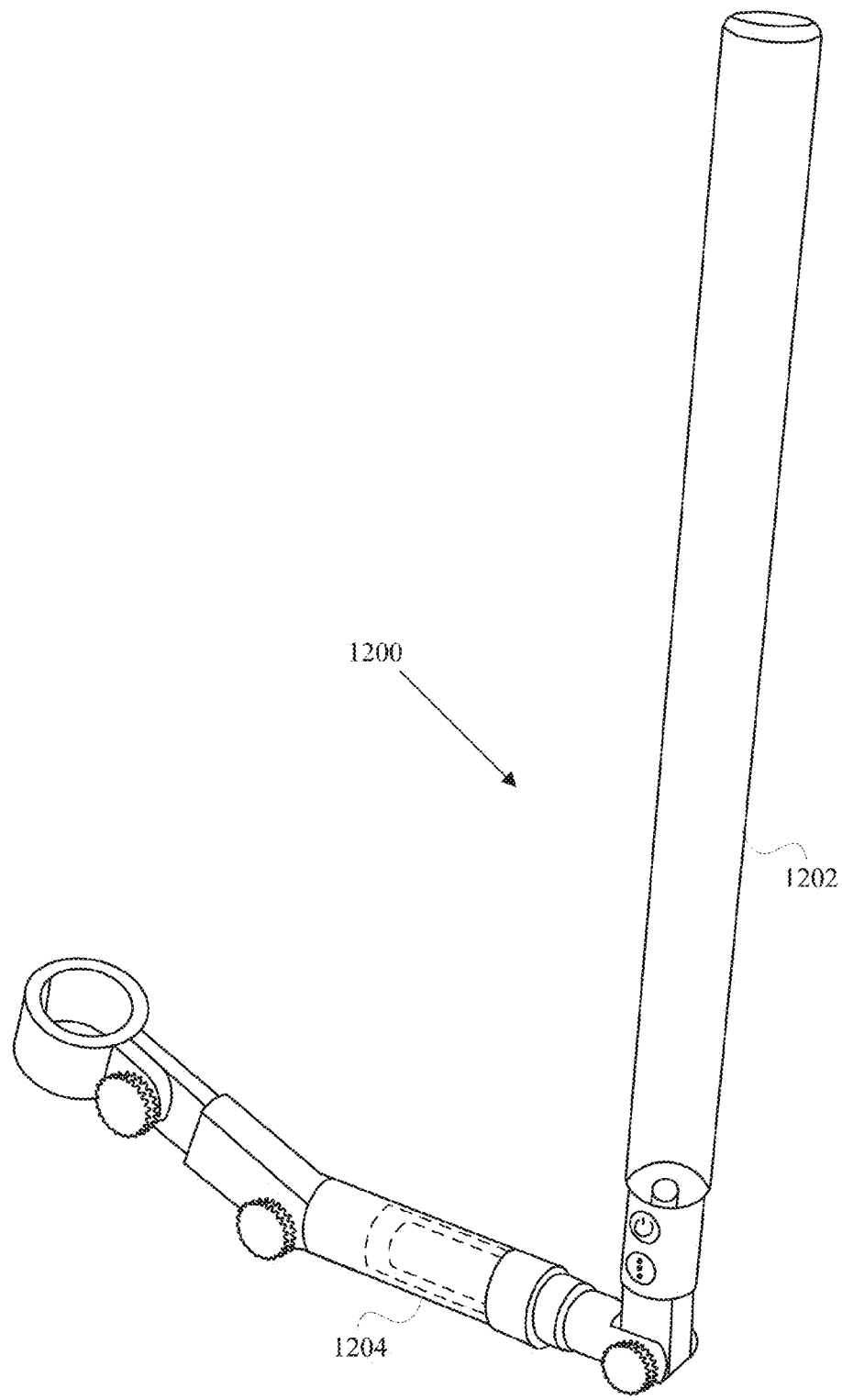
FIG. 12 is a perspective view of a vehicle light apparatus according to various embodiments of the disclosure.

FIG. 12 is a perspective view of a vehicle light apparatus 1200 according to various embodiments. The vehicle light apparatus 1200 can, for example, be similar to the vehicle light apparatus 100 of FIG. 1. In some embodiments, a base 1204 includes a telescoping mechanism such that the base 1204 can extend away from the vehicle frame when fully protracted and is more compact when fully retracted. As described above, the base 1204 can include a quick-release button, turn-knob, magnet, etc., that allows the base 1204 to be attached to and detached from the vehicle frame. One skilled in the art will recognize that a base 1204 that is fully retracted is substantially easier to store, transport, and handle when attaching to or detaching from the vehicle frame. A base 1204 that is fully protracted has an increased likelihood of producing a larger visibility profile by extending away from and above the vehicle frame. One skilled in the art will also recognize that some embodiments may include a telescoping elongated light source 1202 and a telescoping base 1204 that allow of a rider to customize where light emanates from.

Figure 13:
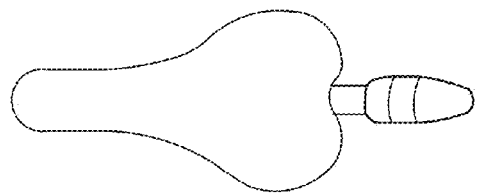
FIG. 13 includes a side view, a rear view, and top views of elongated light sources according to various embodiments of the disclosure.
Figure 13:
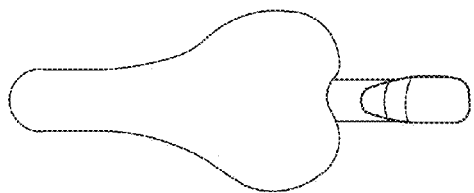
Figure 13:
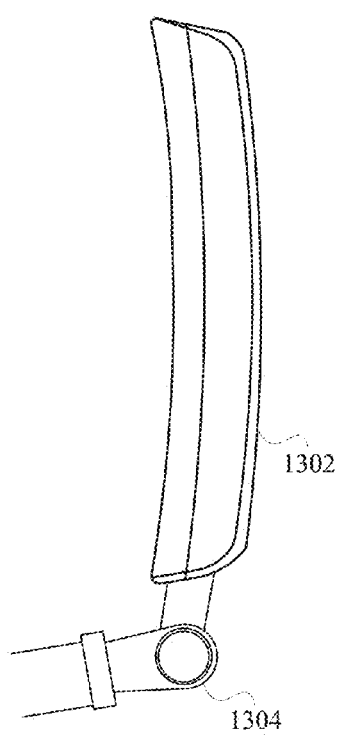
Figure 13:
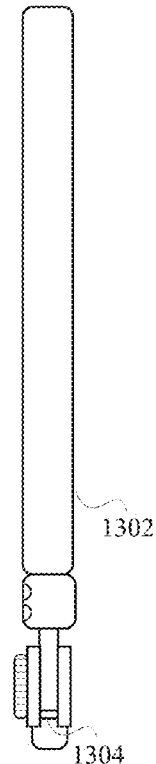

FIG. 13 includes a side view, rear view, and top views of various elongated light sources 1302. As described above, the elongated light source 1302 may be curved to follow the contour of a rider. In some embodiments, the elongated light source 1302 has an aerodynamic profile. For example, FIG. 13 includes top views of two elongated light sources. The first elongated light source is contoured such that the narrower side extends toward the rear of the vehicle (e.g., bicycle, motorcycle, ATV). The second elongated light source is contoured such that the wider side extends toward the rear of the vehicle. One skilled in the art will recognize that contouring can provide performance and non-performance (e.g., aesthetic) benefits.

The vehicle light apparatus can also include one or more motion sensors 1304 (e.g., Global Positioning System (GPS) sensor, inertia sensor, accelerometer). The motion sensors 1304 can be integrated into, or coupled to, the elongated light source 1302, the base, or both. In some embodiments, the motion sensors 1304 can be used to monitor the movement of the vehicle and cause modifications to the light emitted by the elongated light source 1302. For example, if the motion sensor 1304 determines the vehicle has stopped, the intensity may be lessened. In some embodiments, the vehicle light apparatus includes a computer system (e.g., computer system 1600 of FIG. 16) that controls whether the elongated light source 1302 is turned on, how intensely light is emitted, what light patterns are used, etc. For example, the elongated light source 1302 may be configured to turn off after a predetermined time period with no movement and turn on when the motion sensor determines the vehicle has started moving. However, the vehicle light apparatus may also include a manual switch or button that controls whether the elongated light source 1302 is on or off. In some embodiments, the motion sensor 1304 can be used as part of an anti-tamper alarm system.

Figure 14:
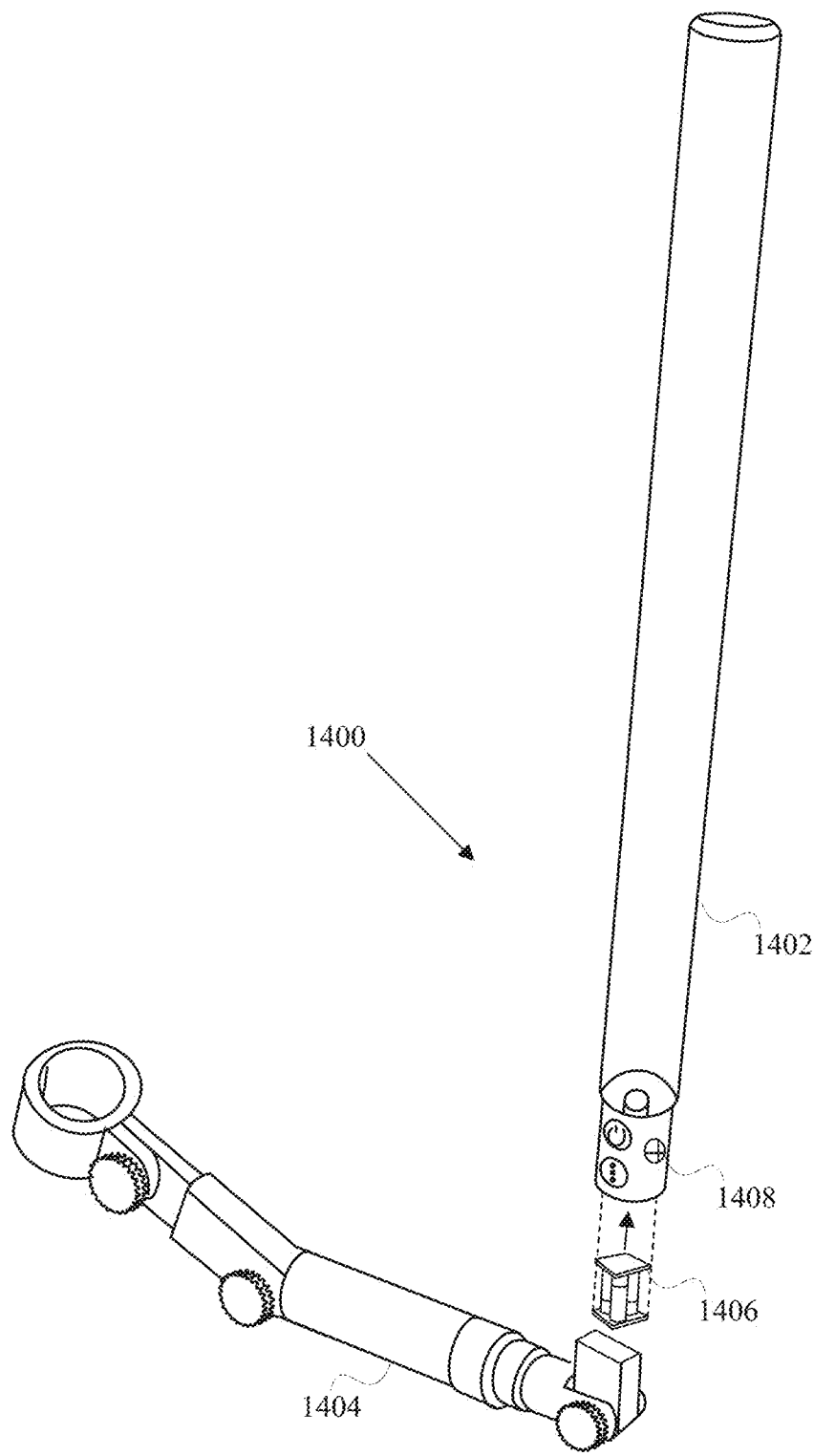
FIG. 14 is a perspective view of a vehicle light apparatus according to one embodiment.

FIG. 14 is a perspective view of a vehicle light apparatus 1400 according to one embodiment. The vehicle light apparatus 1400 can include an elongated light source 1402, base 1404, power source 1406, and a speaker 1408. The power source 1406 can be a battery, a replaceable and/or rechargeable battery pack, a dynamo, a solar cell, some other regenerative power source, or any combination thereof. As shown in FIG. 14, the power supply 1406 can be housed within and removable from the elongated light source 1402 or base 1404. In some embodiments, rechargeable batteries are adapted to be recharged via a universal serial bus ("USB") connection to a laptop, desktop computer, tablet, or power outlet converter. In some embodiments, the vehicle light apparatus 1400 includes a speaker 1408. The speaker 1408 can provide sound alerts to the rider, another vehicle (e.g., following car), a third party (e.g., in case of potential theft), etc. In various embodiments, the speaker 1408 can be operated remotely. For example, the speaker 1408 could be controlled by a remote control, a web application on a web browser, a mobile application, etc., that allow for remote (e.g., parental) monitoring.

Figure 15:
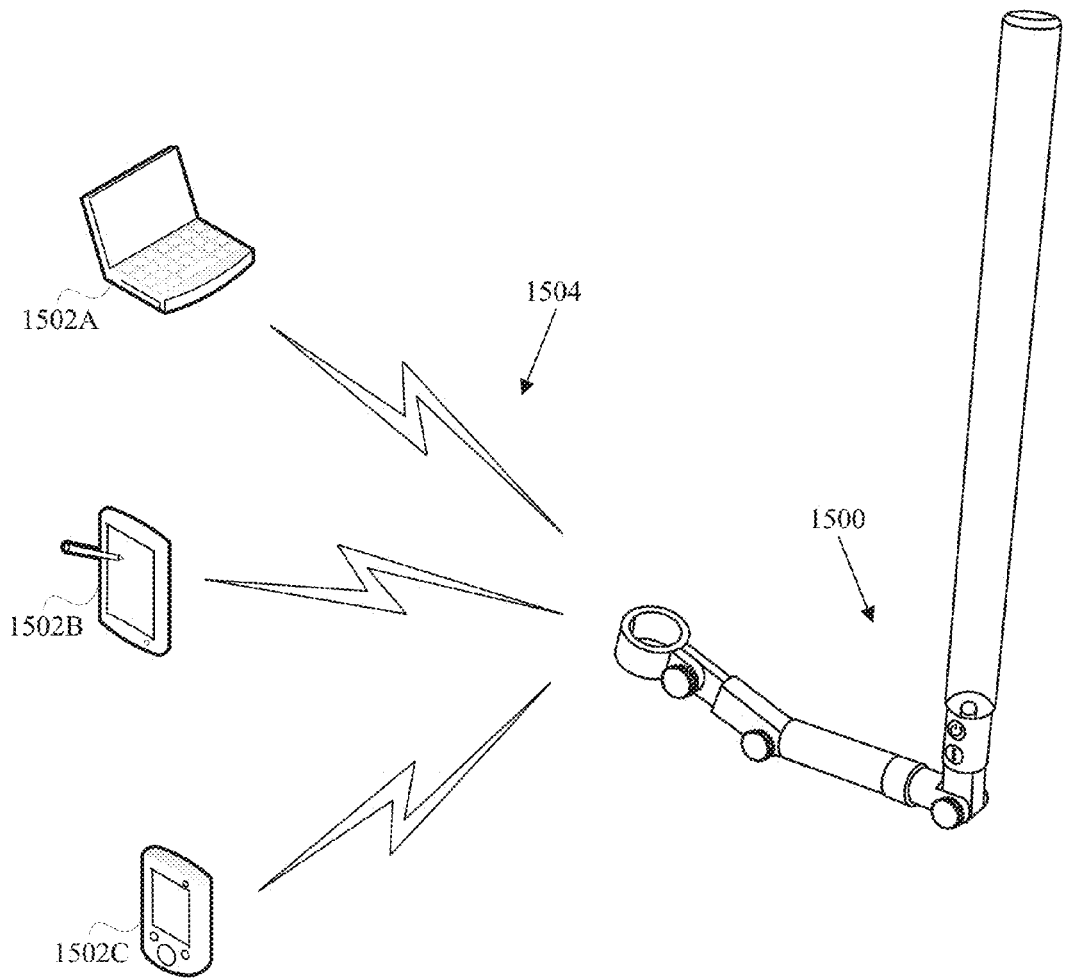
FIG. 15 is a diagram of an exemplary communication network according to some embodiments.

FIG. 15 is a diagram of an exemplary communication network according to some embodiments. In various embodiments, components of the vehicle light apparatus 1500 (e.g., sensors, camera, speaker) are communicatively coupled to one or more display devices 1502A, 1502B, 1502C (collectively "display devices 1502"). The display devices 1502 can be a remote control, tablet, laptop, personal computer, network device, cellular phone, personal digital assistant (PDA), etc. The display devices 1502 can be coupled, wired or wirelessly, to the vehicle light apparatus 1500. In some embodiments, the vehicle light apparatus 1500 is communicatively coupled to one or more display devices 1502 via a computer system (e.g., computer system 1600) that includes an antenna, wireless communication module, etc. The vehicle light apparatus 1500 can communicate over a network 1504 (e.g., Internet, Bluetooth, a local area network, a wide area network, a point-to-point dial-up connection).

Figure 16:
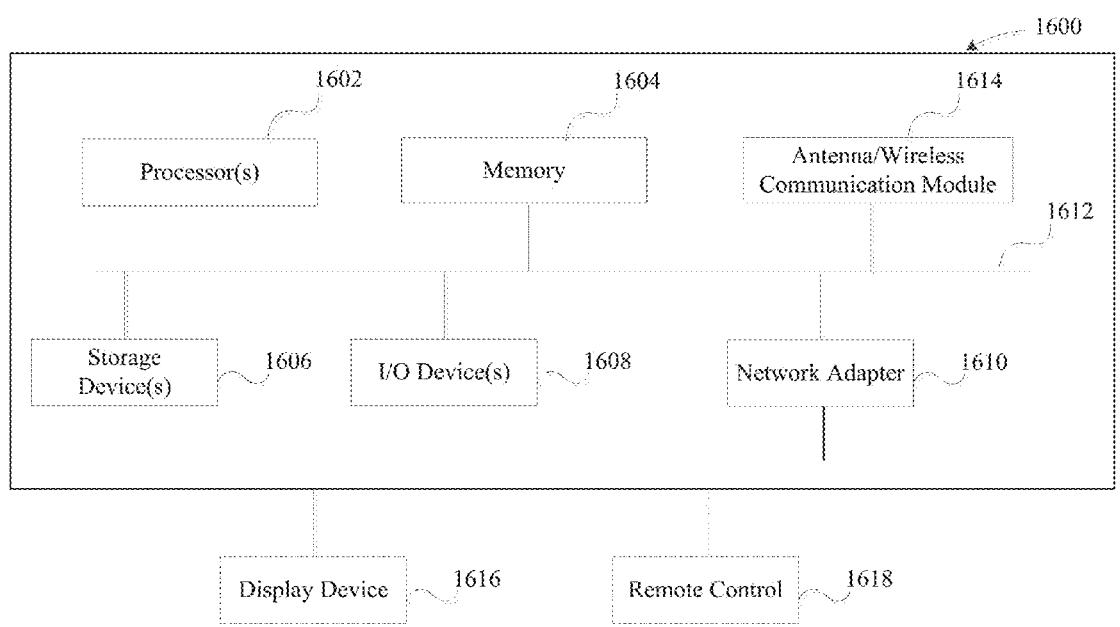
FIG. 16 is a block diagram illustrating an example of a computer system in which at least some operations described herein can be implemented according to various embodiments.

FIG. 16 is a block diagram illustrating an example of a computer system 1600 in which at least some operations described herein can be implemented. The computing system 1600 may include one or more central processing units ("processors") 1602, a memory 1604, input/output devices 1608 (e.g., keyboard and pointing devices, display devices), storage devices 1606 (e.g., disk drives), network adapters 1610 (e.g., network interfaces), and antenna 1614 that are connected to an interconnect 1612. The interconnect 1612 is illustrated as an abstraction that represents any one or more separate physical buses, point to point connections, or both connected by appropriate bridges, adapters, or controllers. The interconnect 1612, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 1604 and storage devices 1606 are computer-readable storage media that may store instructions that implement at least portions of the described systems and methods. In addition, the data structures and message structures may be stored or transmitted via a data transmission medium, such as a signal on a communications link. Various communications links may be used, such as the Internet, a local area network, a wide area network, a point-to-point dial-up connection, etc. Thus, computer-readable media can include computer-readable storage media (e.g., "non-transitory" media) and computer-readable transmission media.

The instructions stored in memory 1604 can be implemented as software and/or firmware to program the processor(s) 1602 to carry out actions described above. In some embodiments, the software or firmware may be initially provided to the computer system 1600 by downloading it from a remote system through the computing system 1600 (e.g., via network adapter 1610). In some embodiments, the antenna 1614 allows information to be sent to, and received from, a display device 1616, a remote control 1618, or both. The antenna 1614 can transmit and receive information wirelessly. The display devices 1616 can be, for example, any of the display devices 1502 of FIG. 15. The remote control 1618 can be a distinct physical device, a web application configured to run in a web browser, a mobile application adapted for a cellular device, PDA, tablet, personal computer, etc. In various embodiments, the remote control 1618 communicates with the computing system 1600 via a wireless (e.g., antenna or wireless communication module 1614) connection or a wired connection. In some embodiments, the display device 1616 is configured to attach to the rider, the vehicle (e.g., handlebars, dashboard, armrest), or both. The antenna or wireless communication module 1614 can facilitate communication and relay commands between the computing system 1600 and the display device 1616 or the remote control 1618.

The techniques introduced herein can be implemented by, for example, programmable circuitry (e.g., one or more microprocessors), programmed with software and/or firmware, entirely in special-purpose hardwired (i.e., non-programmable) circuitry, or in a combination of such forms. Special-purpose circuitry can be in the form of, for example, one or more application-specific integrated circuits (ASICs), programmable logic devices (PLDs), field-programmable gate arrays (FPGAs), etc.

Software or firmware to implement the techniques introduced herein may be stored on a machine-readable storage medium and may be executed by one or more general-purpose or special-purpose programmable microprocessors. A "machine-readable medium," as the term is used herein, includes any mechanism that can store information in a form accessible by a machine (e.g., computer, network device, cellular phone, PDA, manufacturing tool, any device with one or more processors). For example, a machine-accessible medium includes recordable/non-recordable media (e.g., read-only memory (ROM), random access memory (RAM), magnetic disk storage media, optical storage media, flash memory devices).

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. Certain terms that are used to describe the disclosure are discussed above in the Glossary to provide additional guidance to one skilled in the art. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, but no special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in the Detailed Description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While the above Detailed Description describes certain embodiments and the best mode contemplated, no matter how detailed the above appears in text, the invention can be practiced in many ways. Details of the apparatus may vary considerably in its implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the Glossary explicitly defines such terms. Accordingly, the actual scope of the invention encompasses not only the disclosed embodiments, but also all equivalent ways of practicing or implementing the embodiments under the claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. An vehicle light apparatus comprising:
   a power supply;
   a base adapted to connect to a vehicle frame of a vehicle; and
   an elongated light source, supported by the base and coupled to the power supply, that extends above the vehicle frame in a vertical orientation, provides illumination in at least 180 degrees and moves upon experiencing pressure;
   wherein upon removal of said pressure, the elongated light source returns to the vertical orientation.

2. The vehicle light apparatus of claim 1, further comprising:

a quick release mechanism that allows the base to be detachably connected to the vehicle frame.

3. The vehicle light apparatus of claim 1, wherein the base is fixedly attached to the vehicle frame.

4. The vehicle light apparatus of claim 1, wherein the elongated light source comprises a first light source and a second light source that each provide illumination in at least 180 degrees.

5. The vehicle light apparatus of claim 1, wherein the elongated light source emits light towards a seat of the vehicle frame such that the light is reflected by a rider positioned in the seat.

6. The vehicle light apparatus of claim 1, wherein all or substantially all of the elongated light source is illuminated, either by emitting light generated by an active light source housed within the elongated light source or by reflecting light emitted by a distinct light source.

7. The vehicle light apparatus of claim 1, wherein the elongated light source includes a passive light source that redirects light emitted by a distinct light source.

8. The vehicle light apparatus of claim 4, wherein the first light source is a passive light source adapted to reflect light and the second light source is an active light source configured to emit light.

9. The vehicle light apparatus of claim 1, further comprising a sensor, coupled to the base or the elongated light source, that is adapted to sense ambient temperature, proximity to other vehicles, location, current vehicle speed, total distance traveled, total trip time, average vehicle speed, or any combination thereof.

10. A vehicle light apparatus comprising:
a power supply;
a base adapted to connect to a vehicle frame of a vehicle;
an elongated light source, supported by the base and coupled to the power supply, that is remotely controllable and moves from an initial orientation upon experiencing pressure,
wherein upon removal of said pressure, the elongated light source returns to the initial orientation; and
a remote control configured to control the intensity of the elongated light source.

11. The vehicle light apparatus of claim 10, wherein the elongated light source comprises a plurality of active light sources that emit light, are coupled together, and are configured to illuminate in one or more pre-determined patterns.

12. The vehicle light apparatus of claim 10, wherein the remote control is selected from:
a distinct physical device;
a web application configured to run in a web browser; and
a mobile application adapted for a cellular device, personal digital assistant, tablet, personal computer, or any combination thereof.

13. The vehicle light apparatus of claim 11, wherein the one or more pre-determined patterns are selected by a rider of the vehicle using the remote control.

14. The vehicle light apparatus of claim 10, wherein the vehicle light apparatus is configured to synchronize with one or more elements of the vehicle's inherent lighting system.

15. The vehicle light apparatus of claim 10, wherein the vehicle light apparatus is configured to synchronize with one or more distinct light sources coupled to the vehicle frame or worn by a rider of the vehicle.

16. The vehicle light apparatus of claim 10, further comprising a sensor, coupled to the base or the elongated light source, that is adapted to sense ambient temperature, proximity to other vehicles, location, current vehicle speed, total distance traveled, total trip time, average vehicle speed, or any combination thereof.

17. The vehicle light apparatus of claim 10, further comprising a camera that is coupled to the base or the elongated light source.

18. The vehicle light apparatus of claim 10, further comprising a camera that is integrated into the base or the elongated light source.

19. A method for manufacturing a vehicle light apparatus, the method comprising:
providing a power supply;
coupling an active light source to the power supply that is configured to emit light in at least 180 degrees; and
supporting the active light source with a base,
wherein the base includes a quick release mechanism that allows the base to be detachably connected to a vehicle frame of a vehicle.

20. The method of claim 19, further comprising:
providing means to synchronize the vehicle light apparatus with one or more distinct light sources coupled to the vehicle frame or worn by a rider of the vehicle.

21. The method of claim 19, further comprising:
providing means to synchronize the vehicle light apparatus with one or more elements of the vehicle's inherent lighting system.

22. The method of claim 19, further comprising:
providing means to remotely control the active light source;
configuring the active light source to be controlled by the means to remotely control; and
providing a user-configurable illumination setting for the active light source in a memory.

23. The method of claim 22, wherein configuring the active light source to be controlled by the means to remotely control further comprises:
coupling the light source to a wireless communication module that is adapted to relay commands between the means to remotely control and the active light source.

* * * * *